(12) United States Patent
DePaola

(10) Patent No.: US 12,329,136 B1
(45) Date of Patent: Jun. 17, 2025

(54) PNEUMATICALLY CONTROLLED AQUACULTURE APPARATUS

(71) Applicant: Angelo DePaola, Coden, AL (US)

(72) Inventor: Angelo DePaola, Coden, AL (US)

( * ) Notice: Subject to any disclaimer, the term of this patent is extended or adjusted under 35 U.S.C. 154(b) by 413 days.

(21) Appl. No.: 17/981,101

(22) Filed: Nov. 4, 2022

Related U.S. Application Data

(63) Continuation-in-part of application No. 16/681,562, filed on Nov. 12, 2019, now Pat. No. 11,516,996.

(51) Int. Cl.
  *A01K 61/60* (2017.01)
  *A01K 61/55* (2017.01)

(52) U.S. Cl.
  CPC .............. *A01K 61/55* (2017.01); *A01K 61/60* (2017.01)

(58) Field of Classification Search
  CPC ................................ A01K 61/55; A01K 61/60
  USPC .................................. 119/234, 238, 239, 240
  See application file for complete search history.

(56) References Cited

U.S. PATENT DOCUMENTS 9,439,402 B2 * 9/2016 Stillman ................ A01K 61/60

FOREIGN PATENT DOCUMENTS

| KR | 100423152 B1 * | 3/2004 | ............ A01K 61/60 |
| KR | 100643778 B1 * | 11/2006 | ............ A01K 61/60 |
| SU | 1489673 A1 * | 6/1989 | ............ A01K 61/60 |

OTHER PUBLICATIONS

English translation of KR 100423152 B1 (Year: 2004).*
English translation of KR 100643778 B1 (Year: 2006).*
English translation of SU 1489673 A1 (Year: 1989).*

* cited by examiner

*Primary Examiner* — Peter M Poon
*Assistant Examiner* — Danielle A Clerkley
(74) *Attorney, Agent, or Firm* — AdamsIP, LLC; Stephen Thompson; J. Hunter Adams

(57) ABSTRACT

A pneumatically controlled aquaculture apparatus is provided. The apparatus has a lift vessel that lifts containers holding shellfish out of the water when the lift vessel is floating in order to allow air desiccation to prevent biofouling of the equipment and shellfish. The apparatus has a floatation control tank positioned above the containers holding shellfish in a centered position of the apparatus. The apparatus also has a suspension buoy for suspending the apparatus in the water column. The apparatus may be deployed in two different suspended positions with either the floatation control tank or the suspension buoy floating on the water surface and the containers holding shellfish suspended below the surface. The apparatus may also be deployed in a submerged position in which the apparatus is resting on the water bottom.

20 Claims, 17 Drawing Sheets

PNEUMATICALLY CONTROLLED AQUACULTURE APPARATUS

CROSS REFERENCES

This application is a continuation-in-part application of U.S. application Ser. No. 16/681,562, filed Nov. 12, 2019, which application is incorporated herein in its entirety by reference.

FIELD OF THE INVENTION

The present invention refers generally to an aquaculture apparatus and, more specifically, to a pneumatically controlled apparatus for use in varying depths of water.

BACKGROUND

It is estimated that over 90% of oysters, clams, and mussels produced for consumption worldwide come from aquaculture farms. In particular, due to loss of wild oyster reefs, small-scale aquaculture of oysters has increased significantly in recent years. Typical shellfish aquaculture farms utilize baskets, cages, trays, racks, or similar containers for holding the oysters either on the water bottom or off-bottom. Generally, oysters grow best when submerged in nutrient-rich brackish water elevated above the bottom to prevent contact with predators such as destructive worms and snails or suffocation from silting. When growing oysters, approximately once a week they should be raised above the surface for approximately a 24-hour period. This permits the oysters to air dry, killing barnacles, algae and other micro-organisms which attach to their shells. This weekly process is referred to as desiccation.

Once the oysters have dried they must be re-submerged to grow until the next desiccation is required. Between desiccations, the oysters and aquaculture equipment remain submerged in natural water bodies for extended periods of time during the growth of the oyster to a matured state suitable for harvest. During submerged periods, a biofilm of microorganisms may form on outer surfaces of the shellfish and the submerged aquaculture equipment, which can lead to the attachment of nuisance bio-fouling organisms such as barnacles and unwanted bivalve shellfish. Bio-fouling organisms create nuisance by clogging mesh or pores in shellfish containers, which reduces water flow through the containers and food availability for the shellfish, thereby slowing growth of culture shellfish. Additionally, bio-fouling organisms attach directly to shellfish causing visual defects that reduce market value. Unwanted organisms also add excessive weight to the system and can damage moving parts of the aquaculture equipment. Periodic emergence of the equipment and shellfish in the air above the sea surface desiccates the biofilm before it sufficiently establishes to permit attachment of bio-fouling organisms. Emergence of the equipment eliminates the need to pressure wash or clean equipment and shellfish by other means after bio-fouling organisms colonize the exposed surfaces.

In productive shellfish growing areas such as the Gulf of Mexico, desiccation of gear at weekly intervals is typically required to control bio-fouling. Currently employed methods for bio-fouling control rely on intensive and potentially unsafe manual labor practices. Typical aquaculture systems comprise rectangular containers constructed of heavy plastic coated wire mesh that are assembled with multiple container compartments for holding flexible plastic mesh bags of varying mesh sizes that contain shellfish at various growth stages. The containers typically have two air-filled floats attached to the top of the containers on the outside edges on opposing sides to maximize stability to wave action. The air-filled floats provide adequate buoyancy to float the oyster-filled containers below the surface of the water for growing the oysters. The normal bio-fouling practice employed with floating aquaculture systems is to manually flip the containers upside down so the floats are then on the bottom of the containers. Float buoyancy elevates the oysters and the containers in the air above the water surface. In shallow areas, flipping the containers is often done by wading, but boats are required to work deeper or colder waters. Relatively calm waters are required to flip the containers from boats. After a desiccation period of about 24 hours, the containers are manually flipped back into the growth position until the next desiccation treatment.

This method of bio-fouling control is labor intensive and time consuming, which drives up oyster production costs. In addition, there are safety risks involved with the manual flipping of the oyster-filled containers, which can be extremely heavy. To limit the weight, smaller containers or groups of containers must be utilized, thereby limiting the potential scale of an operation. Floating shellfish gear is vulnerable to high wave energy and debris fields during hurricanes or other storm events. While sinking gear in advance of such events reduces vulnerability and losses, sinking numerous small floating gear units is very time consuming and should be done well in advance of storm conditions. Raising gear is even more laborious and time consuming. Current methods of shellfish aquaculture require large tracts of publicly-owned water bottoms and the waters located above to grow oysters. Significant manual labor is required to manipulate and maintain the gear associated with these methods and to accomplish the desiccation process while also protecting gear and crop from storm damage. In 2018 alone, oyster farmers in North Carolina lost an estimated $10 million, while farmers in Florida lost an estimated $20 million due to damage caused by Hurricanes Florence and Michael, respectively.

To minimize labor, reduce safety hazards in the desiccation process, and prevent loss of gear and crop, some aquaculture devices have been developed that provide pneumatic control of the floatation of the devices so that the containers holding shellfish may be lifted and held above the surface of the water by adding compressed air to tanks positioned on a bottom side of the device, thereby providing a more efficient desiccation process. The air may then be evacuated from the tanks and displaced by water to return the device to a submerged position to allow shellfish to grow inside the submerged containers. Such devices are effective in relatively shallow bodies of water in which one end of the device can be pneumatically lifted to the water surface while the other end rests on the water bottom, which provides stability of the device during the process of floating the device to the surface and sinking the device to the sea floor so that the device does not inadvertently overturn. However, in deeper bodies of water, the process of floating such an aquaculture device for desiccation does not allow a portion of the device to remain in contact with the water bottom, which may cause instability as the aquaculture device rises or sinks in the water column. Consequently, such devices may be prone to overturning due to a lack of stability when floating the device from the water bottom to the water surface in a deeper body of water.

Therefore, a need exists in the art for a floating aquaculture device for use in deeper bodies of water. Additionally, a need exists in the art for a method of using such an aquaculture device that allows the device to be floated from the water bottom to the water surface in a stable manner that prevents the device from overturning.

SUMMARY

The aquaculture apparatus of the present disclosure allows for aquaculture activities in deeper bodies of water by providing pneumatic control of movement of the apparatus through the water column in a stable manner. The present aquaculture apparatus also provides for automated air desiccation of shellfish produced in off-bottom containerized aquaculture systems for the purposes of controlling biofouling on the surfaces of the shellfish and aquaculture equipment. In one aspect, a pneumatically controlled apparatus for shellfish aquaculture comprises a lift vessel, a container for holding shellfish, an inflatable buoy bladder, and a compressed gas source configured to independently supply gas to each of the lift vessel and the buoy bladder. The buoy bladder is disposed above both the container and the lift vessel when the apparatus is in an upright position for normal use. The buoy bladder is retained in a centered position of the apparatus, preferably by a frame secured to the apparatus. A lift vessel fluid supply line connects the lift vessel to the compressed gas source, and a buoy bladder fluid supply line connects the buoy bladder to the compressed gas source. In a preferred embodiment, these gas lines are connected to a manifold having valves for independent control of gas flows. The compressed gas is preferably air, and the compressed gas source is preferably a pressurized tank, such as a SCUBA tank, or an air compressor.

The aquaculture apparatus is adapted for use in three positions: a floating position, a suspended position, and a submerged position. When in the submerged position, the apparatus may be resting on the sea floor or, alternatively, positioned at a desired depth in the water column. When in the floating position, the lift vessel is filled with gas and the container holding shellfish is positioned above the surface of the water. Thus, in the floating position, the shellfish may be held out of the water for a period of time sufficient to allow air desiccation in order to prevent the formation of biofilm on the containers and shellfish, and various aquaculture activities may additionally be performed while the apparatus is floating. While in the floating position, the apparatus can also be towed to a different location to enhance growth and flavor or to avoid hazards to the health of aquatic species or human health, such as pollution from pathogens or harmful chemicals. When in the suspended position, the buoy bladder is inflated with gas so that it floats on the water surface with both the container holding shellfish and the lift vessel suspended under the water surface below the buoy bladder. To sink the lift vessel down to the suspended position, gas is evacuated from the lift vessel. In a preferred embodiment, the lift vessel comprises a lift tank having rigid walls, and gas is evacuated from the lift tank by displacing the air in the lift tank with water. In an alternative embodiment, the lift vessel may comprise an inflatable lift bladder, which is preferably disposed within a rigid cage to protect the lift bladder and to retain it in a fixed position. In this embodiment, gas may simply be evacuated from the lift bladder, which results in the lift bladder collapsing into a flattened state. When the apparatus is in the submerged position, the buoy bladder is deflated and gas is evacuated from the lift vessel so that the apparatus is resting on the water bottom. The apparatus may be left in the submerged position for a desired period of time to allow for shellfish growth before harvesting or to avoid storm waves. Alternatively, the apparatus may optionally further comprise a second buoy tethered to the apparatus so that the apparatus can be positioned at any desired depth in the water column rather than resting on the water bottom. The second buoy floats at the water surface, and the length of the tethering line determines the depth of the apparatus in the water column.

The apparatus may be moved sequentially in steps from the floating position to the suspended position to the submerged position, and then, by reversing the steps, from the submerged position to the suspended position to the floating position. To move the apparatus from the submerged position to the suspended position, air is supplied to the buoy bladder to inflate the buoy bladder, thereby causing the apparatus to rise in the water column until the buoy bladder is floating on the water surface with both the container and the lift vessel suspended in the water below the buoy bladder. To then move the apparatus from the suspended position to the floating position, air is supplied to the lift vessel, which causes the lift vessel to rise from the suspended position to the floating position in which the container holding shellfish is lifted and held above the water surface. In a preferred embodiment, the lift vessel is a tank having an opening located on a bottom side of the tank. In this embodiment, when air is supplied to the lift tank, the air displaces water inside the lift tank by forcing the water out of the opening. By retaining the buoy bladder in a centered position of the apparatus, stability is maintained so that the apparatus does not inadvertently overturn due to one side of the lift tank floating before an opposite side of the lift tank, which could cause instability. The process of floating the apparatus may be repeated each time bio-fouling treatment is required.

To reverse this process and move the apparatus from the floating position back to the suspended position, pressure in the lift tank may be relieved to the atmosphere so that water then displaces the air in the lift tank via water entering the lift tank through the opening on the bottom side of the lift tank, thereby causing both the lift tank and the container to sink to the suspended position while the buoy bladder is inflated and floating on the water surface. Once pressure is removed from the lift tank, the weight of the apparatus will cause water to displace the air inside the lift tank. To then move the apparatus from the suspended position to the submerged position, pressure on the buoy bladder is relieved so that the buoy bladder deflates, thereby causing the entire apparatus to sink to the bottom of the body of water. The rate of deflation of the buoy bladder may be controlled so that the apparatus sinks slowly in a controlled manner.

In another embodiment, the apparatus may comprise a frame structure designed for holding shellfish therein and attached to the lift vessel. The apparatus may further comprise a floatation control tank and a suspension buoy tethered to the apparatus. The floatation control tank has a rigid tank wall and an opening on the bottom of the tank for the displacement of water from the tank by supplying air to the tank to force water out of the opening or for the evacuation of air from the tank through water entering the tank through the opening. The floatation control tank is attached to a top of the frame structure in a generally centered position of the apparatus and is disposed above the lift vessel. The floatation control tank is preferably a generally elongated tank that is disposed in a generally vertical position such that the height of the tank is greater than the width or diameter of the tank. In this embodiment, the apparatus may be deployed at various positions within the water column, including a floating position with the lift vessel floating on the water surface, a first suspended position with the floatation control tank floating on the water surface, a second suspended position with the suspension buoy floating on the water surface and the apparatus suspended in the water column at a depth defined by the length of the tether line, and, optionally, a completely submerged position with the lift vessel resting on the water bottom.

Accordingly, one object of the present disclosure is to provide an aquaculture apparatus having pneumatic floatation control for sinking and floating the apparatus in a controlled manner that allows for use of the apparatus in deeper bodies of water. Another object of the present disclosure is to provide a method utilizing the present apparatus for aquaculture activities in deeper bodies of water. Yet another object of the present disclosure is to provide an aquaculture apparatus that may be deployed at varying positions within the water column.

DESCRIPTION OF THE DRAWINGS

These and other features, aspects, and advantages of the present invention will become better understood with regard to the following description, appended claims, and accompanying drawings where:

DETAILED DESCRIPTION

In this disclosure, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, ingredients, steps, etc. are optionally present. For example, an article "comprising" components A, B, and C can contain only components A, B, and C, or can contain not only components A, B, and C, but also one or more other components. The term tubes, tanks, and pontoons, as used herein, are interchangeable.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Turning now to the drawings, FIGS. 1-5 illustrate a preferred embodiment of an aquaculture apparatus 10 that may be utilized for shellfish aquaculture activities in relatively deep bodies of water. FIGS. 9-18 illustrate another preferred embodiment of an aquaculture apparatus 100 for use in deeper water. The present aquaculture apparatus 10 provides pneumatic control of movement of the apparatus through the water column in a stable manner. The present aquaculture apparatus 10 also provides for automated air desiccation of shellfish 28 produced in off-bottom containerized aquaculture systems for the purposes of controlling bio-fouling on the surfaces of the shellfish and aquaculture equipment.

Figure 1:
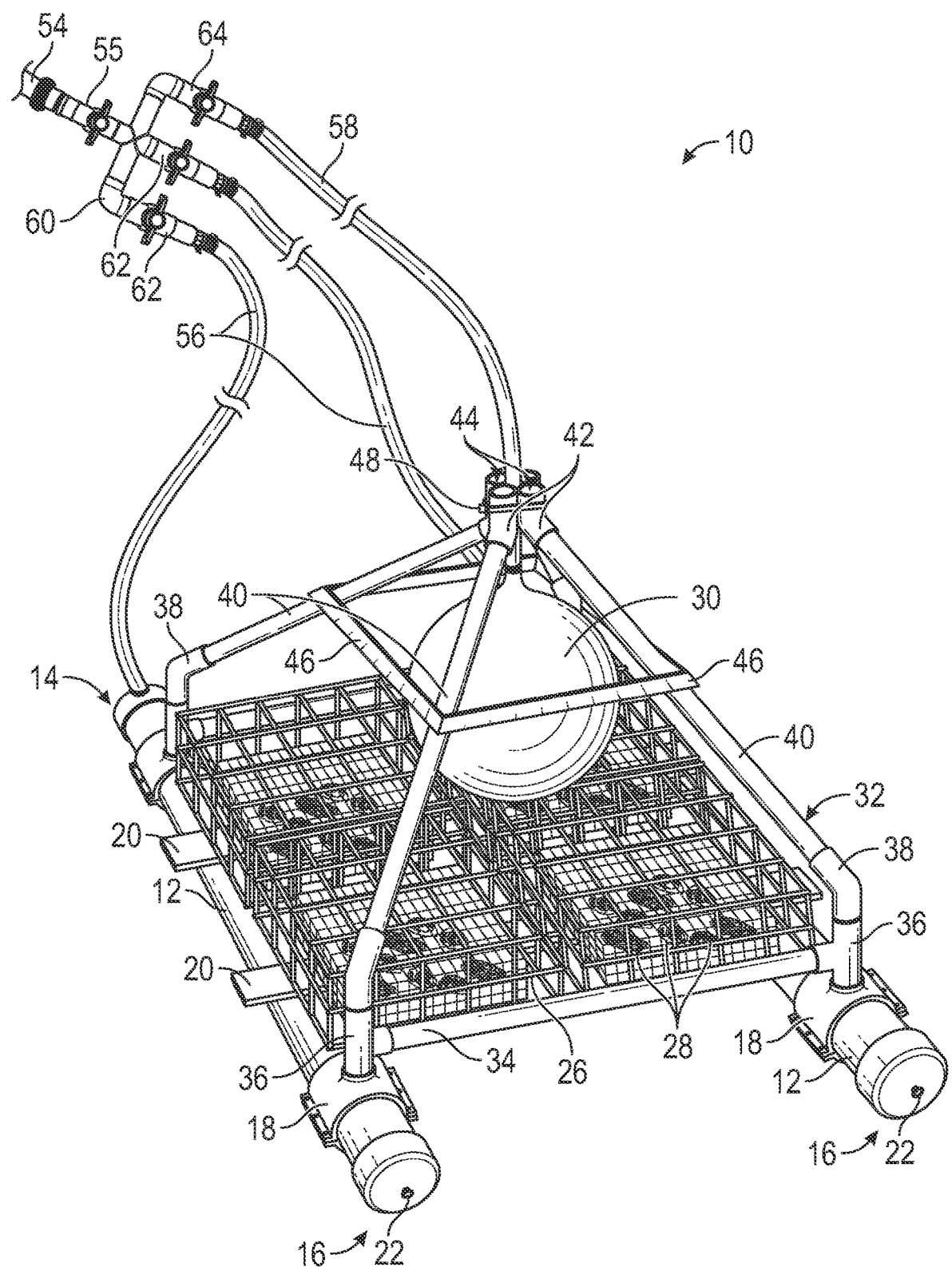
FIG. 1 is a top perspective view of an aquaculture apparatus in accordance with the present disclosure.
Figure 2:
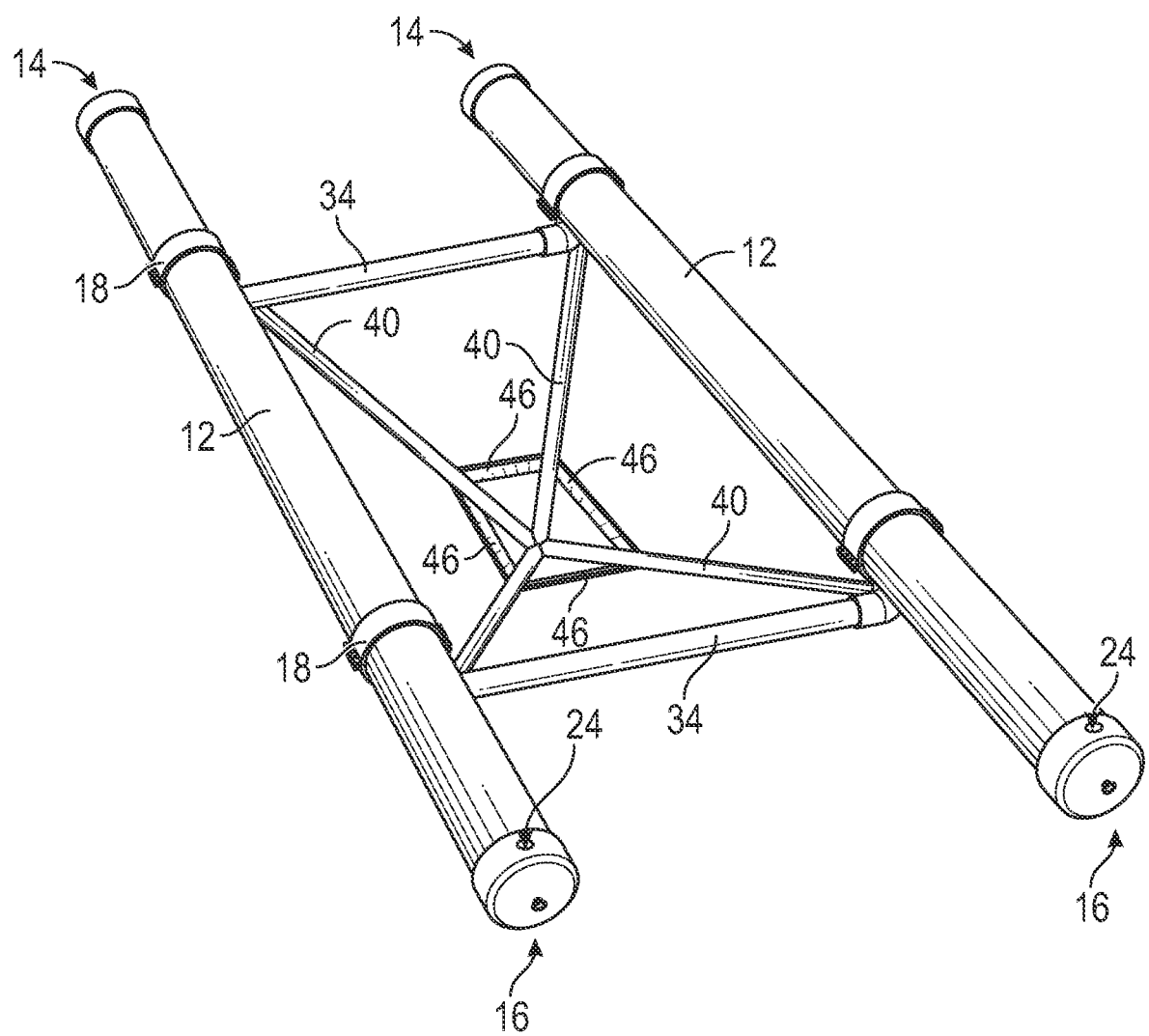
FIG. 2 is a bottom perspective view of an aquaculture apparatus in accordance with the present disclosure.

The aquaculture apparatus 10 comprises a lift vessel 12, a container 26 for holding shellfish 28, an inflatable buoy bladder 30, and a compressed gas source 50 configured to independently supply gas to each of the lift vessel 12 and the buoy bladder 30. The buoy bladder 30 is disposed above both the container 26 and the lift vessel 12 when the apparatus 10 is in an upright position for normal use. FIG. 1 and FIGS. 3-5 each show the apparatus 10 in an upright position, while FIG. 2 shows the apparatus inverted to illustrate a bottom side of the apparatus (some components have been omitted from FIG. 2 to better illustrate certain components of the apparatus). As best seen in FIG. 1, the buoy bladder 30 is retained in a centered position of the apparatus, preferably by a frame 32 secured to the apparatus. As used herein, a "centered position" indicates that the buoy bladder 30 is retained in a position that is generally centered between a front end 14 and a rear end 16 of the apparatus, as well as being retained in a generally centered position between two sides of the apparatus between the front and rear ends. The buoy bladder 30 is made of a flexible material so that it can be inflated and deflated. Due to the flexible nature of the material, the buoy bladder 30 may shift off-center within certain tolerances during normal operation of the apparatus, though the bladder is generally retained in the centered position in order to maintain stability when the apparatus is being moved between different positions, as well as when the apparatus is moving through all segments of the water column.

A lift vessel fluid supply line 56 connects the lift vessel 12 to the compressed gas source 50, and a buoy bladder fluid supply line 58 connects the buoy bladder 30 to the compressed gas source 50. In a preferred embodiment, these gas lines are connected to a manifold 60 having valves 62, 64 for independent control of gas flows. The compressed gas is preferably air, and the compressed gas source 50 is preferably a pressurized tank, such as a SCUBA tank, or an air compressor. In alternative embodiments, other suitable gases may be utilized, such as nitrogen or helium.

Figure 3:
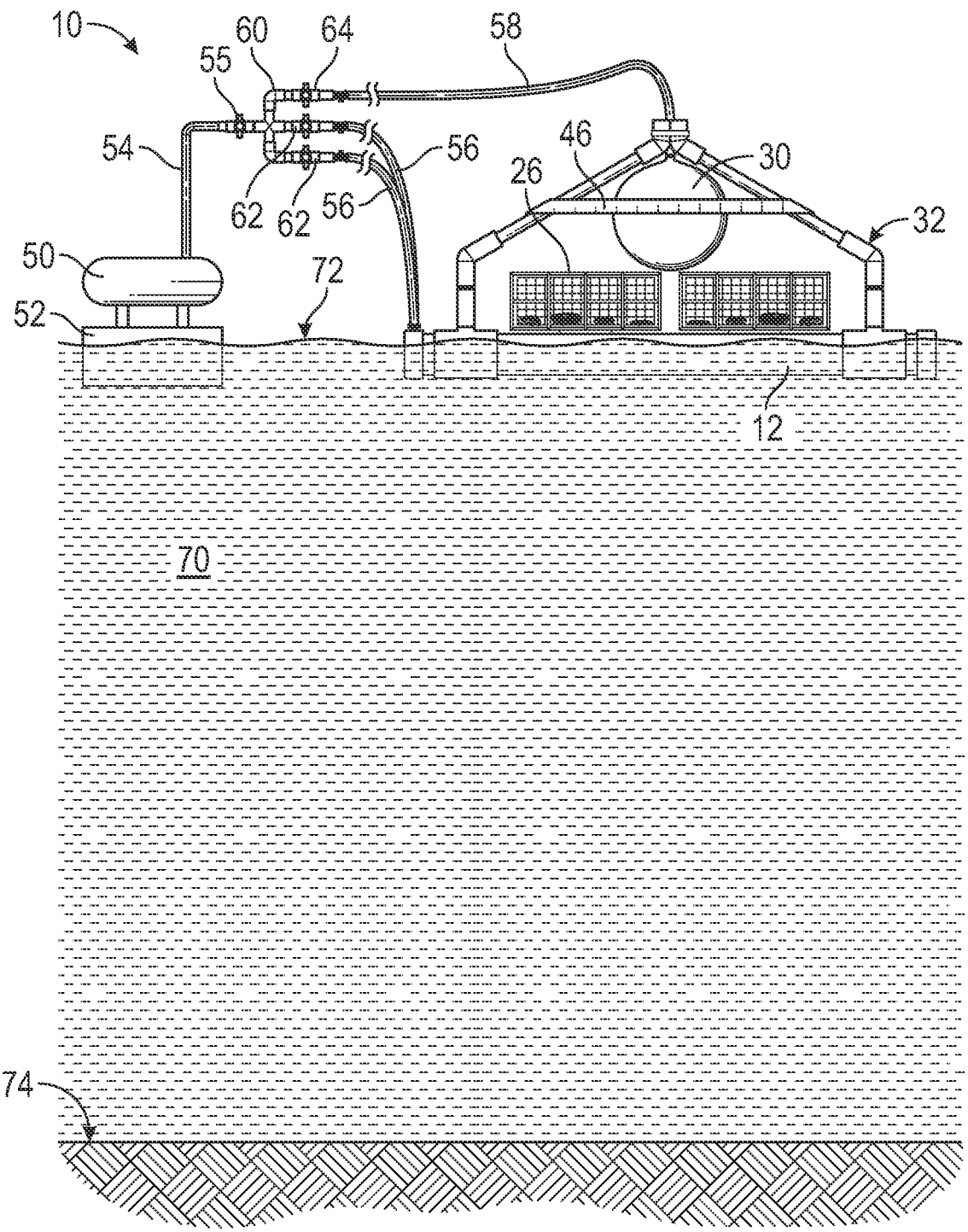
FIG. 3 is a side view of an aquaculture apparatus in a floating position while in use in a body of water in accordance with the present disclosure.
Figure 4:
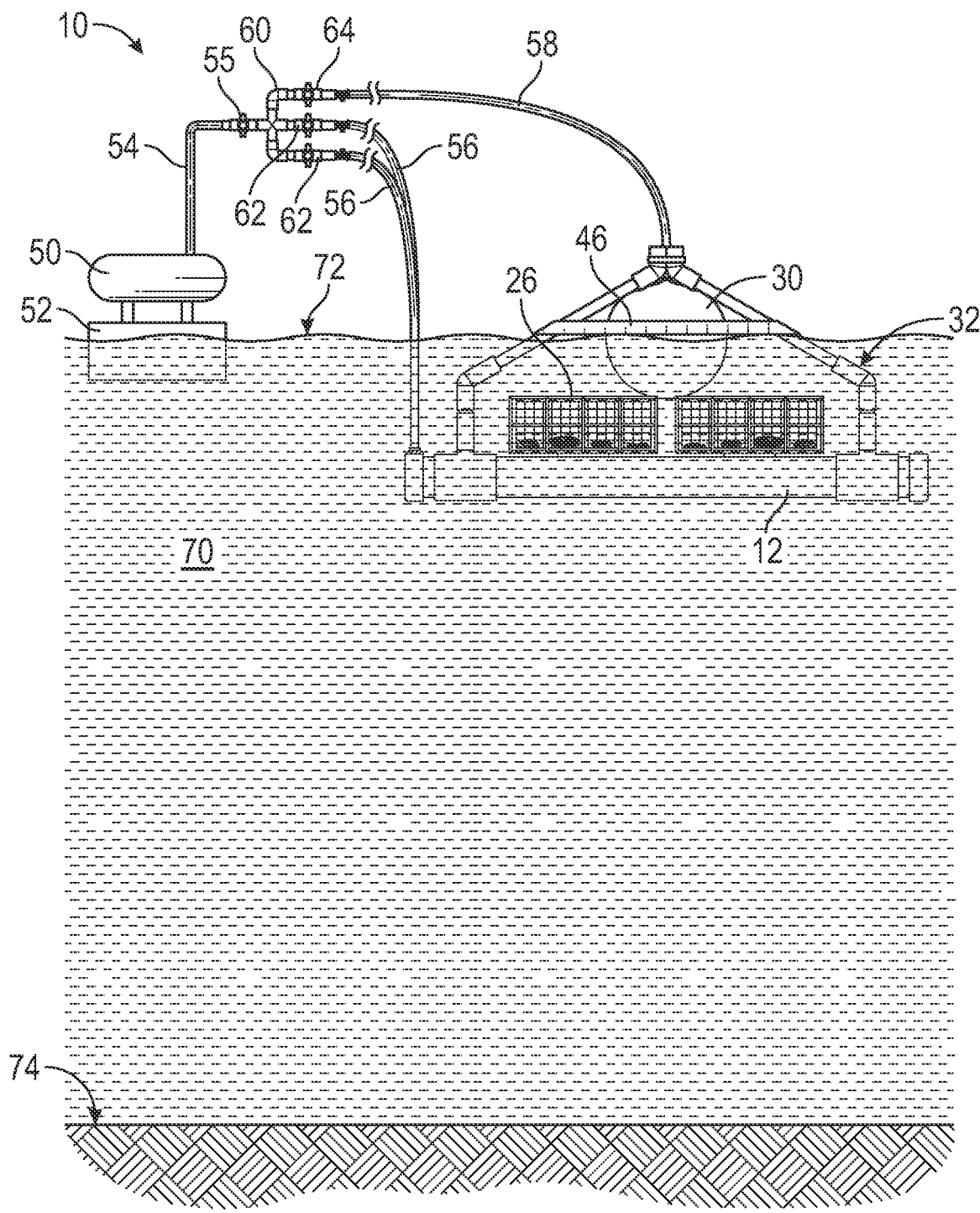
FIG. 4 is a side view of an aquaculture apparatus in a suspended position while in use in a body of water in accordance with the present disclosure.
Figure 5:
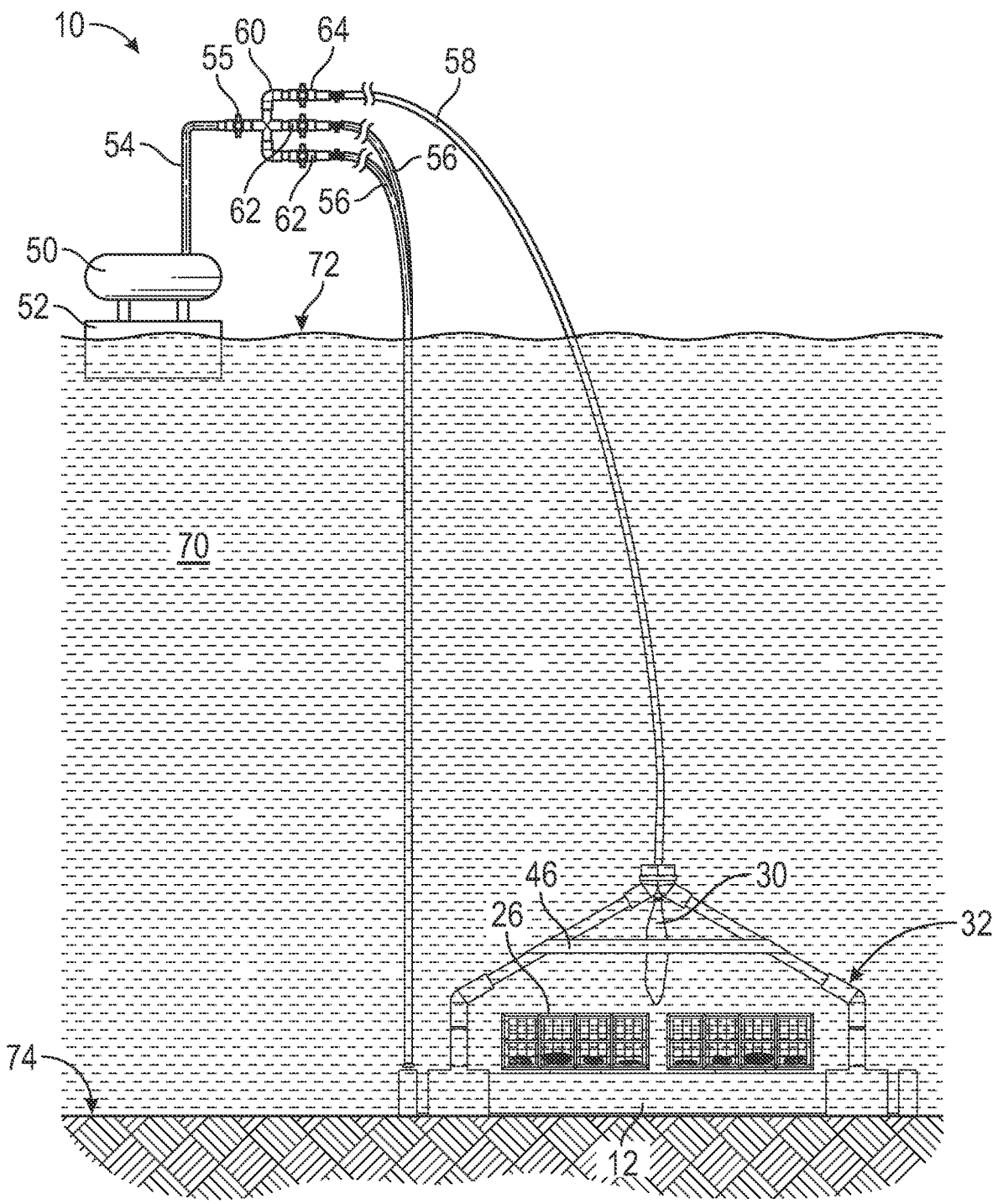
FIG. 5 is a side view of an aquaculture apparatus in a submerged position while in use in a body of water in accordance with the present disclosure.
Figure 8:
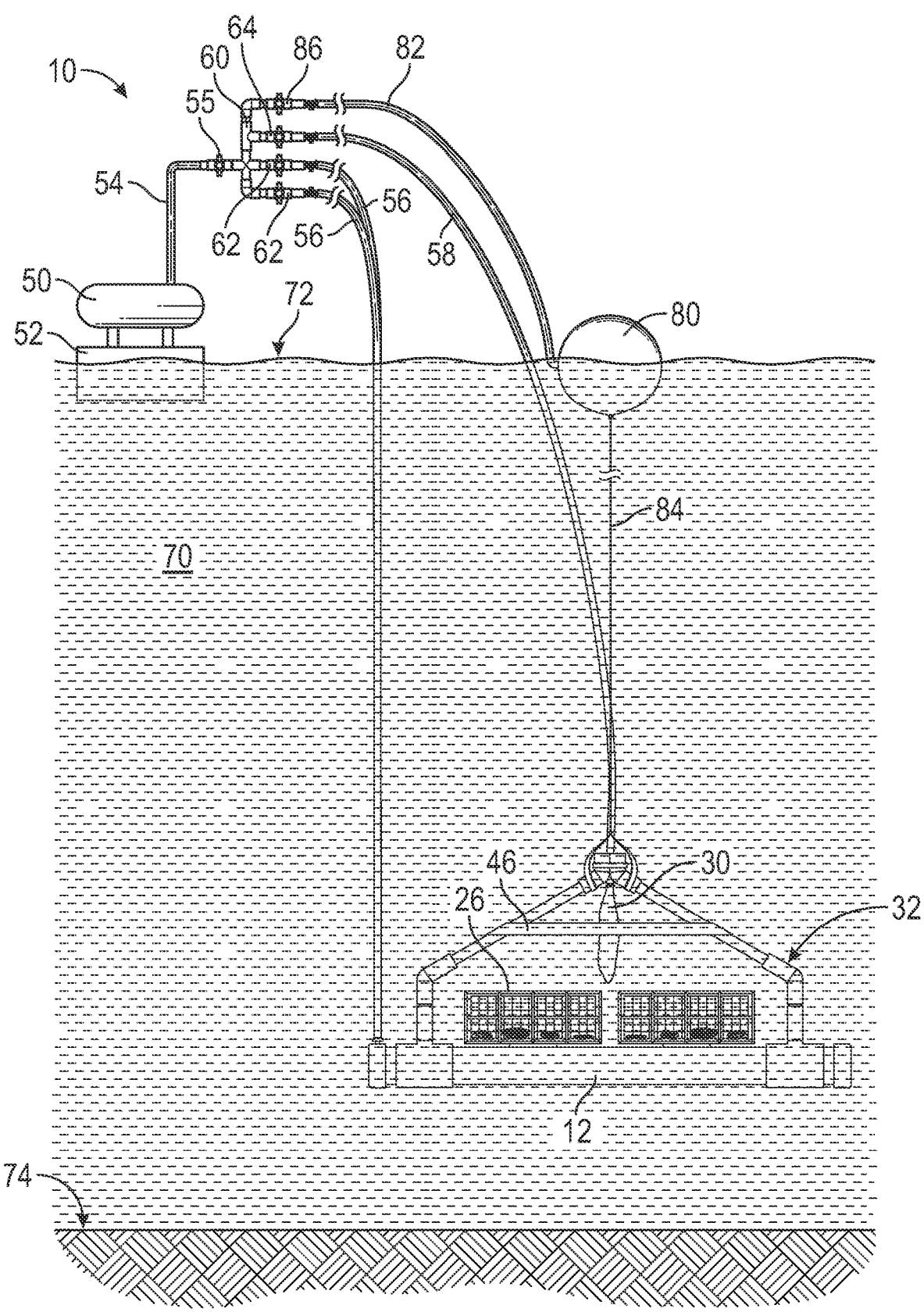
FIG. 8 is a side view of an alternative embodiment of an aquaculture apparatus in a submerged, off-bottom position while in use in a body of water in accordance with the present disclosure.

As shown in FIGS. 3-5, respectively, the aquaculture apparatus 10 is adapted for use in three positions: a floating position, a suspended position, and a submerged position. When in the floating position, as shown in FIG. 3, the lift vessel 12 is filled with gas and the container 26 holding shellfish 28 is positioned above the surface 72 of the water 70. Thus, in the floating position, the shellfish 28 may be held out of the water 70 for a period of time sufficient to allow air desiccation in order to prevent the formation of biofilm on the containers 26 and shellfish 28, and various aquaculture activities may additionally be performed while the apparatus 10 is floating. When in the suspended position, as shown in FIG. 4, the buoy bladder 30 is inflated with gas with both the container 26 holding shellfish 28 and the lift vessel 12 suspended under the water surface below the buoy bladder 30. The suspended position provides a transition between the floating and submerged positions that allows stability when moving the apparatus between the floating and submerged positions. In addition, some aquaculture activities may be performed in the suspended position, if desired. For instance, in some cases, it may be desired to allow shellfish 28 to grow near the water surface, depending on certain environmental conditions. In such cases, the apparatus may be left in the suspended position for a period of time for shellfish growth. When in the submerged position, as shown in FIG. 5, the buoy bladder 30 is deflated and gas is evacuated from the lift vessel 12 so that the apparatus 10 is resting on the water bottom 74. The apparatus may be left in the submerged position for a desired period of time to allow for shellfish growth before harvesting or to avoid storm damage from high wave energy. In an alternative embodiment, as shown in FIG. 8, the apparatus 10 may be held at a desired depth in the water column by a second buoy 80 tethered to the apparatus even when the buoy bladder 30 is deflated and gas is evacuated from the lift vessel 12.

The lift vessel 12 preferably comprises a lift tank 12 having rigid walls and an opening 24 on a bottom side of the lift tank 12, which can be seen in FIG. 2. The opening 24 allows water to enter the interior of the lift tank 12 to displace air in the lift tank 12 when moving the apparatus from the floating position to the suspended position. The opening 24 also provides a passageway through which air may displace water in the lift tank 12 by forcing the water out through the opening 24 when moving the apparatus from the suspended position to the floating position. In a preferred embodiment, as best seen in FIGS. 1 and 2, the apparatus 10 comprises a plurality of lift tanks 12 that each have an elongated tubular shape and that are spaced apart. In this embodiment, the apparatus 10 further comprises a plurality of lift vessel fluid supply lines 56 each connecting a respective one of the plurality of lift tanks 12 to the compressed gas source 50. Each lift tank 12 has a first end 14 and a second end 16. As shown in FIG. 1, each lift vessel fluid supply line 56 is connected to a respective first end 14 of a lift tank 12, and each lift tank 12 has an opening 24 located on the bottom side of the lift tank 12 and positioned at the second end 16 of the lift tank 12, as shown in FIG. 2. FIG. 1 illustrates the apparatus with two lift tanks 12, though additional spaced lift tanks may be utilized to increase the capacity of the apparatus.

As shown in FIG. 1, the tubular lift tanks 12 may preferably be constructed of a length of pipe, such as PVC (polyvinyl chloride) pipe, with end caps. In a preferred embodiment, the lift tanks 12 may be constructed of 12-inch diameter pipes sealed with end caps to provide a sealed enclosure for floatation. Although lift tanks of other sizes or configurations may be utilized, cylindrical tubular tanks spaced apart may be preferred because such a lift tank configuration may function in a similar manner as a catamaran, thereby allowing the apparatus to be towed more easily by a motorized vessel by reducing drag as the apparatus 10 moves on the water surface when in the floating position. To facilitate towing, one or both ends of each tubular lift tank 12 may have a loop 22 installed thereon for securing a tow rope, chain, or similar type of tow line. Enhanced mobility of the apparatus makes it possible to more easily escape adverse environmental conditions such as oil spills, sewerage discharges, algae blooms and storm water pollution. An additional advantage of mobility is the ability to relocate mature oysters from a brackish water area where they are grown to a water body with a higher salt content. The oysters can be relocated and submerged there for several days to obtain a salty taste prior to going to market, which may increase the market value of the shellfish.

The apparatus 10 may further comprise a frame 32 that is adapted to retain the inflatable buoy bladder 30 in a centered position of the apparatus. The frame 32 also provides a rigid connection between the spaced lift tanks 12. As shown in FIG. 1, the frame 32, as well as the lift tanks 12, may preferably be constructed of PVC pipe and pipe fittings, which may provide inexpensive and lightweight construction materials that may be sized to construct aquaculture apparatuses of varying dimensions. However, it should be appreciated by one skilled in the art that other suitable materials may be utilized in constructing the frame 32, such as metal or other types of polymers, which may optionally be formed from a solid structure rather than having a hollow interior. In a preferred embodiment, as best seen in FIG. 1, the frame 32 comprises four frame members 40 that generally meet at a centered position of the apparatus 10 above the containers 26 and lift tanks 12. The frame 32 preferably includes cross-support members 34 to provide structural support between the spaced lift tanks 12. In a preferred embodiment, the frame 32 may be secured to each of the lift tanks 12 with a plurality of tapping saddles 18 (although the tapping saddles 18 are used only to secure the frame 32 to the lift tanks 12 and do not tap into the piping used to form the lift tanks). The tapping saddles 18 are preferably positioned toward each end 14, 16 of each of the tubular lift tanks 12. Each tapping saddle 18 may comprise two halves, which may be bolted together around the pipe forming each lift tank 12, and may have a tee 36 attached to a top half of the saddle 18. The tee 36 may be used to connect the cross-support members 34 thereto in order to form structural supports between lift tanks 12 and to connect the frame members 40 to the lift tanks 12. Elbow joints 38, which are preferably 45-degree elbows, are preferably used to connect the frame members 40 to the tees 36 so that the four frame members 40 may generally meet at a centered position of the apparatus 10 to retain the buoy bladder 30 in the center of the apparatus. In a preferred embodiment, as shown in FIG. 1, additional elbow joints 42 may be connected to the opposite end of each frame member 40 so that the elbow joints 42 physically contact each other and provide a space between the elbow joints 42 through which the buoy bladder fluid supply line 58 may run to supply gas to the buoy bladder 30 positioned inside the frame 32. The elbow joints 42 may be bound together by a band 48 tightened around the elbow joints 42 or any similar type of fastening mechanism suitable for holding the elbow joints 42 together to maintain structural integrity of the frame 32.

In a preferred embodiment, each of the elbow joints 42 may have an open end 44 facing upward. The open ends 44 may allow water to displace air inside the frame members 40 when moving the apparatus to the submerged position so that the apparatus sinks to the water bottom 74 easily. An opening (not shown) may be formed in each tee 36 or at another low point of the frame 32 so that water inside the frame members 40, as well as the cross-support members 34, can drain out of the frame 32 when moving the apparatus to the floating position in order to minimize the weight of the apparatus when it is out of the water.

In a preferred embodiment, as best seen in FIG. 1, the frame 32 further comprises a plurality of retaining members 46 secured to the frame members 40 in a position suitable to prevent the buoy bladder 30 from inadvertently sliding between any of the frame members 40 during normal operation of the apparatus 10. For instance, when moving the apparatus from the suspended position to the floating position, the first end 14 of each lift tank 12 may rise to the water surface 72 before the second end 16, which may cause the buoy bladder 30 to shift toward a position between the two frame members 40 closest to the first end 14 of each lift tank 12. In this case, the retaining members 46 may prevent the buoy bladder 30 from sliding between those frame members 40, thereby retaining the buoy bladder 30 in a generally centered position, which may be defined by a perimeter formed by the retaining members 46. When lowering the apparatus from the floating position to the suspended position, the opposite retaining member 46 may prevent the buoy bladder 30 from sliding between frame members 40 in a similar manner. In alternative embodiments, other types of retaining structures, such as a netting or a cage structure, may be utilized to retain the buoy bladder 30 in a centered position between frame members 40, though it is preferred that a solid structure not be used in order to minimize drag as the apparatus moves up and down in the water column.

Although FIG. 1 illustrates one preferred embodiment of a frame 32 suitable for retaining the buoy bladder 30 in a generally centered position above the containers 26 and lift tanks 12, it should be understood that any frame structure suitable for retaining the buoy bladder 30 in such a centered position may be utilized, which may include frames having various shapes and configurations, and still fall within the scope of the present disclosure.

The aquaculture apparatus 10 comprises at least one container 26 for holding shellfish 28. As best seen in FIG. 1, the container is preferably a cage, and the apparatus preferably comprises a plurality of cages 26 for holding the shellfish 28, though any type of container or carrier suitable for use in shellfish aquaculture may be utilized. The container 26 should be designed to provide sufficient water flow around the shellfish 28 to allow for adequate shellfish growth. One or more planks 20, beams, or similar support structure may be utilized to help support the weight of the cages 26 and shellfish 28. The planks 20 may preferably be secured to each of the lift tanks 12. The containers 26 may be secured to the planks 20, lift tanks 12, and/or frame 32 by any suitable securing or fastening means known in the art. For instance, shellfish cages 26 may be bolted to the planks 20 and may optionally also be tied down to or strapped to the lift tanks 12 and/or cross-support members 34 in order to ensure that the cages 26 remain secured to the apparatus 10 at all times during normal operation, which may include the apparatus 10 being tilted when moving it between the floating, suspended, and submerged positions.

In a preferred embodiment, the apparatus 10 further comprises a manifold 60 configured to independently supply gas from the compressed gas source 50 to each of the lift vessel 12 and the buoy bladder 30. As best seen in FIG. 1, the manifold 60 comprises a plurality of valves for controlling the gas flow. The manifold 60 is fluidly connected to the compressed gas source 50 through a primary fluid supply line 54 and has a primary gas supply valve 55 for controlling the flow of gas from the compressed gas source 50 into the manifold 60. The manifold 60 is fluidly connected to the buoy bladder 30 through a buoy bladder fluid supply line 58, which preferably extends through an opening between the frame members 40 and is connected to a top side of the buoy bladder 30. The manifold has a float valve 64 for supplying gas to the buoy bladder 30 in order to float the apparatus 10 from the submerged position to the suspended position in which the buoy bladder 30 is floating at the water surface 72. The manifold 60 further comprises at least one lift valve 62 for supplying gas to one or more lift vessels 12 through at least one lift vessel fluid supply line 56.

In a preferred embodiment in which the apparatus 10 comprises a plurality of tubular lift tanks 12, the apparatus 10 further comprises a plurality of lift tank fluid supply lines 56 individually connecting each respective lift tank 12 to the manifold 60. The manifold 60 preferably comprises a plurality of lift valves 62 arranged to individually control the flow of gas to each respective lift tank 12. Alternatively, a single lift valve 62 may control the flow of gas to multiple lift tanks 12, though independent control to each lift tank 12 is preferred to maintain stability by ensuring that all lift tanks rise simultaneously when floating the apparatus. In a preferred embodiment, each lift tank fluid supply line 56 is connected to the first end 14 of each respective lift tank 12, and the opening 24 on the bottom side of each lift tank 12 is positioned at the second end 16. In addition, each lift tank fluid supply line 56 is preferably connected to a top side of the lift tank 12. This configuration allows tubular lift tanks 12 to move between the floating and suspended positions while maintaining stability of the apparatus.

A method of controlling floatation of an aquaculture apparatus 10 is also provided. FIG. 3 shows the apparatus 10 in the floating position, FIG. 4 shows the apparatus 10 in the suspended position, and FIG. 5 shows the apparatus 10 in the submerged position. In the floating position, the lift vessel 12, which may comprise a plurality of lift tanks 12, is filled with gas, which is preferably air, so as to lift the containers 26 and shellfish 28 out of the water 70. In the floating position, the buoy bladder 30 may be in an inflated or a deflated state. FIG. 3 shows the buoy bladder 30 in an inflated state, but it may preferably be deflated to minimize its size if work is to be done on the apparatus, such as harvesting shellfish. In the suspended position, the buoy bladder 30 is inflated so that the buoy bladder 30 floats on the water surface 72 with the container 26 suspended in the water below the buoy bladder 30. In the suspended position, gas is evacuated from the lift vessel 12 so that the lift vessel 12 sinks below the water surface. In the preferred embodiment utilizing rigid lift tanks 12, the air evacuated from inside the lift tanks 12 is displaced with water 70 as the air is evacuated to sink the lift tanks 12. In the submerged position, the buoy bladder 30 is deflated, and air is evacuated from the lift tanks 12 so that the apparatus 10 sinks to the bottom 74 of the body of water 70.

The apparatus 10 may be moved sequentially in steps from the floating position to the suspended position to the submerged position, and then, by reversing the steps, from the submerged position to the suspended position to the floating position. To move the apparatus from the submerged position to the suspended position, air or another suitable gas is supplied to the buoy bladder 30 to inflate the buoy bladder 30, thereby causing the apparatus 10 to rise in the water column until the buoy bladder 30 is floating on the water surface 72 with both the container 26 and the lift tanks 12 suspended in the water 70 below the buoy bladder 30, as shown in FIG. 4. Air may be supplied to the buoy bladder 30 by opening the primary gas supply valve 55 to supply air from the compressed gas source 50 to the manifold 60. The float valve 64 may then be opened to supply air from the compressed air source 50 to the buoy bladder 30 through the manifold 60. The rate of air flow to the buoy bladder 30 may preferably be controlled so that the apparatus 10 rises through the water column at a slow, steady rate to maintain stability. The rate of air flow may be controlled manually using the float valve 64 and/or the primary gas supply valve 55, or optionally, the apparatus 10 may include automated control equipment to control the air flow rate.

Once in the suspended position, the apparatus may then be moved to the floating position, as shown in FIG. 3. To move the apparatus from the suspended position to the floating position, air is supplied to the lift tanks 12, which causes the lift tanks 12 to rise from the suspended position to the floating position in which the container 26 holding shellfish 28 is lifted and held above the water surface 72. Air may be supplied to the lift tanks 12 by opening the primary gas supply valve 55 and each of the lift valves 62 to supply air to each lift tank 12. The lift valves 62 are preferably opened simultaneously so that each lift tank 12 rises simultaneously to maintain stability of the apparatus. Alternatively, the lift valves 62 may be opened sequentially to shift shellfish 28 side to side in order to tumble the shellfish 28 within the containers 26 or to balance the load if shellfish 28 have been pushed to one side of the containers 26 by waves or current. As air flows into each lift tank 12 at the first end 14 of the lift tank 12, the water 70 inside the lift tank 12 is forced out of the opening 24 on the bottom side of the lift tank 12 at the second end 16 of the lift tank 12 until air displaces substantially all of the water in each lift tank 12. Having the lift vessel fluid supply line 56 connection and the opening 24 at opposite ends of each lift tank 12 ensures that substantially all of the water in each lift tank 12 is displaced. Once the water is displaced with air and the lift tanks 12 are floating on the water surface 72, the lift valves 62 may be closed to shut off the flow of air. With the openings 24 positioned on the bottom side of each lift tank 12 and the weight of the apparatus 10 keeping the openings 24 just below the water surface 72, air pressure inside the lift tanks 12 will be maintained so that the lift tanks 12 remain afloat without requiring a constant flow of air to the lift tanks 12.

Because air flows into each lift tank 12 at one end 14, the first end 14 tends to rise to the water surface 72 before the second end 16, thereby tilting the apparatus 10 during the process of moving the apparatus between the suspended and floating positions. However, by retaining the inflated buoy bladder 30 in a centered position of the apparatus, the inflated buoy bladder 30 remains floating on the water surface 72 until the lift tanks 12 completely lift it out of the water, which provides leverage that prevents the first end 14 from floating above the second end 16 to an extent that would cause the apparatus to become unstable and inadvertently overturn and that also prevents side-to-side inversion of the apparatus 10. Thus, the frame 32 retaining the inflated buoy bladder 30 in a centered position maintains stability during the process of moving the apparatus 10 between the suspended and floating positions.

To reverse this process and move the apparatus 10 from the floating position back to the suspended position, air is evacuated from the lift tanks 12 by relieving pressure in each lift tank 12 to the atmosphere so that water 70 then displaces the air in each lift tank 12 via water 70 entering each lift tank 12 through the openings 24 on the bottom side of each lift tank 12, thereby causing both the lift tanks 12 and the container 26 to sink to the suspended position while the buoy bladder 30 is inflated and floating on the water surface 72. If the buoy bladder 30 is deflated, it should be inflated by supplying air to the buoy bladder 30 via the float valve 64 prior to relieving pressure on the lift tanks 12. Pressure on the lift tanks 12 may be relieved via the lift tank fluid supply lines 56 by disconnecting the primary fluid supply line 54 from the primary gas supply valve 55 and opening the lift valves 62 and the primary gas supply valve 55. At this point, the float valve 64 should remain closed to maintain air pressure inside the inflated buoy bladder 30. In an alternative embodiment, the manifold 60 may have one or more separate designated pressure relief valves that may be opened individually for the purposes of relieving pressure on one or more lift tanks 12, as well as the buoy bladder 30, to the atmosphere without the need to disconnect the primary fluid supply line 54 from the manifold 60. Once pressure is removed from each lift tank 12, the weight of the apparatus 10 will cause water 70 to displace substantially all of the air inside each lift tank 12. As the air is displace by water 70, the lift tanks 12 will sink to the suspended position below the buoy bladder 30, which will then be floating on the water surface 72, as shown in FIG. 4.

Once the apparatus 10 is in the suspended position, it may then be moved to the submerged position, as shown in FIG. 5. To move the apparatus from the suspended position to the submerged position, pressure on the buoy bladder 30 is relieved so that the buoy bladder 30 deflates, thereby causing the entire apparatus 10 to sink to the bottom 74 of the body of water 70. Pressure on the buoy bladder 30 may be relieved to the atmosphere via the buoy bladder fluid supply line 58 by opening the float valve 64 and the primary gas supply valve 55 with the primary fluid supply line 54 being disconnected. The rate of deflation of the buoy bladder 30 may be controlled so that the apparatus 10 sinks slowly in a controlled manner to maintain stability.

As shown in FIGS. 3-5, the compressed gas source 50 is preferably secured to a floating barge 52 or similar floating structure floating on the water surface 72. The barge 52 may be moved to service multiple aquaculture apparatuses 10 in an area by connecting and disconnecting the compressed air source 50 to and from separate manifolds 60 for each apparatus 10 to be moved between the floating, suspended, or submerged positions. Alternatively, a separate gas source manifold may be used to connect a plurality of primary fluid supply lines 54 to a plurality of manifolds 60 for each aquaculture apparatus 10 so that the compressed gas source 50 may service multiple apparatuses 10 without the need to move the compressed gas source 50. In this case, the compressed gas source 50 may optionally be secured to a dock or other stationary structure. The compressed gas source 50 is preferably a pressurized air tank or an air compressor.

The length of the buoy bladder fluid supply line 58 and the lift vessel fluid supply lines 56 may be varied depending on the depth of water 70 in which the aquaculture apparatus 10 is being deployed. A spooling device may optionally be utilized to manage lengths of air supply lines so that the lines may be spooled when moving the apparatus to the floating position and unspooled when moving the apparatus to the submerged position. The manifold 60 is preferably kept above the water surface and may be secured to a separate floating structure, which may additionally function as a marking buoy to mark the location of a submerged apparatus. By utilizing a lift vessel 12 in combination with a buoy bladder 30 retained in a centered position of the apparatus, the present aquaculture apparatus may be utilized in relatively deep bodies of water 70 while providing stable movement between three different modes of operation and through the entire water column. The floating position is generally used for air desiccation of shellfish 28, as well as various aquaculture activities, such as harvesting shellfish, and the submerged position is generally used for growing shellfish. The suspended position may be utilized simply as a stable transition stage between the floating and submerged positions, or may additionally be used for shellfish growth near the water surface. The apparatus 10 may optionally be attached to an anchor with an anchor line to limit movement of the apparatus on the water surface when in the floating or suspended positions.

Figure 6:
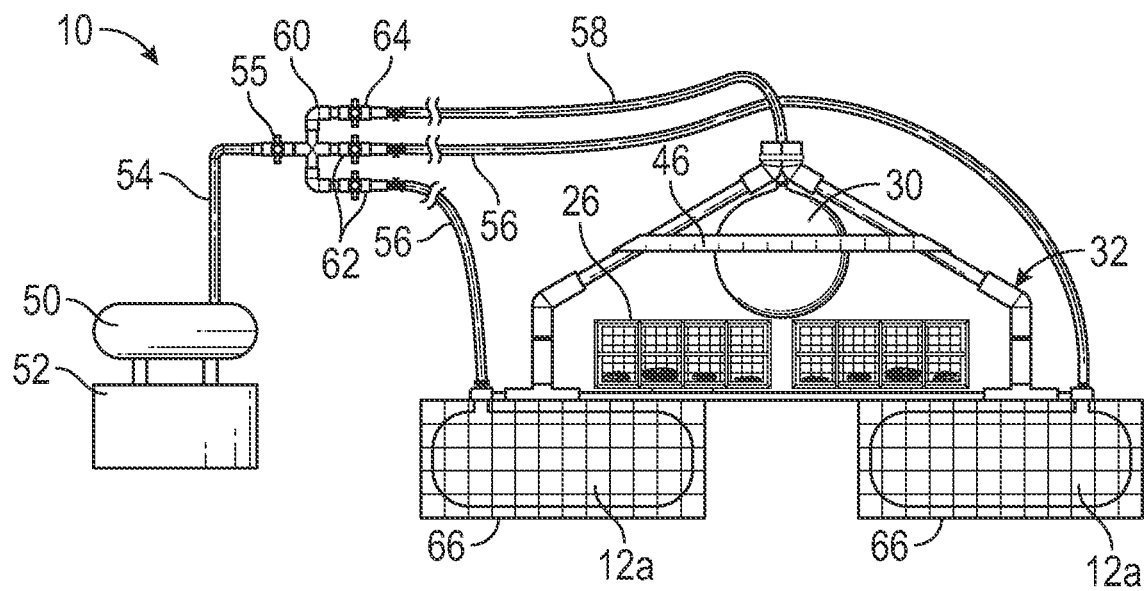
FIG. 6 is a side view of an alternative embodiment of an aquaculture apparatus in accordance with the present disclosure.
Figure 7:
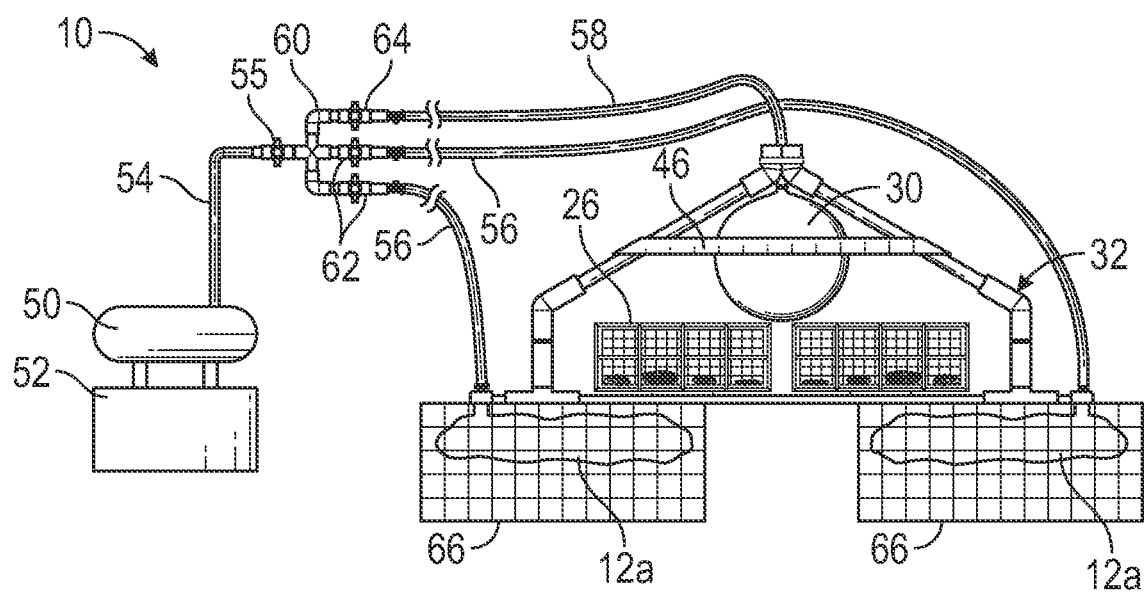
FIG. 7 is a side view of an alternative embodiment of an aquaculture apparatus in accordance with the present disclosure.

In an alternative embodiment, the lift vessel 12 may comprise an inflatable lift bladder 12a, as shown in FIGS. 6 and 7, and preferably two lift bladders 12a positioned at opposing ends of the apparatus and spanning the width of the apparatus. Each lift bladder 12a is preferably disposed within a rigid cage 66 to protect the lift bladder 12a to retain it in a fixed location. In this embodiment, air may simply be evacuated from each lift bladder 12a, thereby causing each lift bladder 12a to collapse into a flattened state. FIG. 6 shows each lift bladder 12a inflated so the bladders push against an interior of each cage 66, and FIG. 7 shows each lift bladder 12a partially deflated, though the bladders may be further deflated when the apparatus is in the suspended or submerged position. Thus, to move the apparatus from the floating position in which each lift bladder 12a is inflated to the suspended position, air may be evacuated from each lift bladder 12a by relieving pressure on each lift bladder 12a so that each lift bladder 12a deflates and collapses. When inflating the lift bladders 12a to float the apparatus to the floating position, air may be supplied to both lift bladders 12a simultaneously or may be supplied sequentially to cause one end of the apparatus to rise before the opposing end.

FIG. 8 illustrates an alternative embodiment in which the apparatus 10 further comprises a second buoy 80 tethered to the apparatus by a flexible tether line 84, the length of which may be varied to control the depth of the apparatus in the water column. The tether line 84 is preferably secured to the frame 32 at a generally centered position of the apparatus. In this embodiment, the apparatus 10 is in the submerged position with the buoy bladder 30 deflated and air evacuated from the lift tanks 12, but the apparatus is not resting on the water bottom 74. Instead, the second buoy 80 is inflated so that it is floating on the water surface 72, thereby causing the tether line 84 to hold the lift tanks 12 in a position off the water bottom at a desired depth in the water column. The second buoy 80 may optionally be connected to the manifold 60 by a second buoy fluid supply line 82 so that the second buoy 80 can be inflated using the compressed gas source 50. Gas flow to the second buoy 80 may be controlled by a second buoy fluid supply valve 86 on the manifold 60. To move the apparatus from a mid-water column position to the water bottom 74, the second buoy 80 may simply be deflated so that the second buoy 80 loses buoyancy and sinks. Alternatively, the second buoy 80 may not be connected to the manifold, in which case, to move the apparatus from a mid-water column position to the water bottom 74, the apparatus can be raised to the floating position and the tether line 84 detached from the apparatus before then moving the apparatus back to the submerged position as shown in FIG. 5.

The alternative embodiment shown in FIG. 8 provides the apparatus 10 with the capability to maintain and operate at any vertical position throughout the water column. This capability may allow the apparatus 10 to be used in the production of a variety of other aquatic species in pens or on lines suspended below the lift tanks 12, such as cultured crustacea, finfish, or seaweeds. For instance, kelp may be supported by lines suspended below the apparatus and grown at various depths within the water column. In this case, the apparatus 10 may be utilized solely for producing non-shellfish species, or for producing more than one aquatic species simultaneously. In cases in which the apparatus 10 is utilized solely for growing non-shellfish species, the shellfish containers may optionally be removed from the apparatus. Controlling the position of the apparatus within the water column may accelerate growth of organisms such as kelp by moving kelp lines up and down within the water column diurnally for photosynthesis and respiration. This alternative configuration may also allow for quickly and easily sinking gear to the water bottom to avoid damaging storm waves. In addition, access to suspended gear at the surface would avoid the need for SCUBA divers or submersibles for aquaculture activities such as feeding, density reductions, harvest, gear maintenance and repair.

Figure 9:
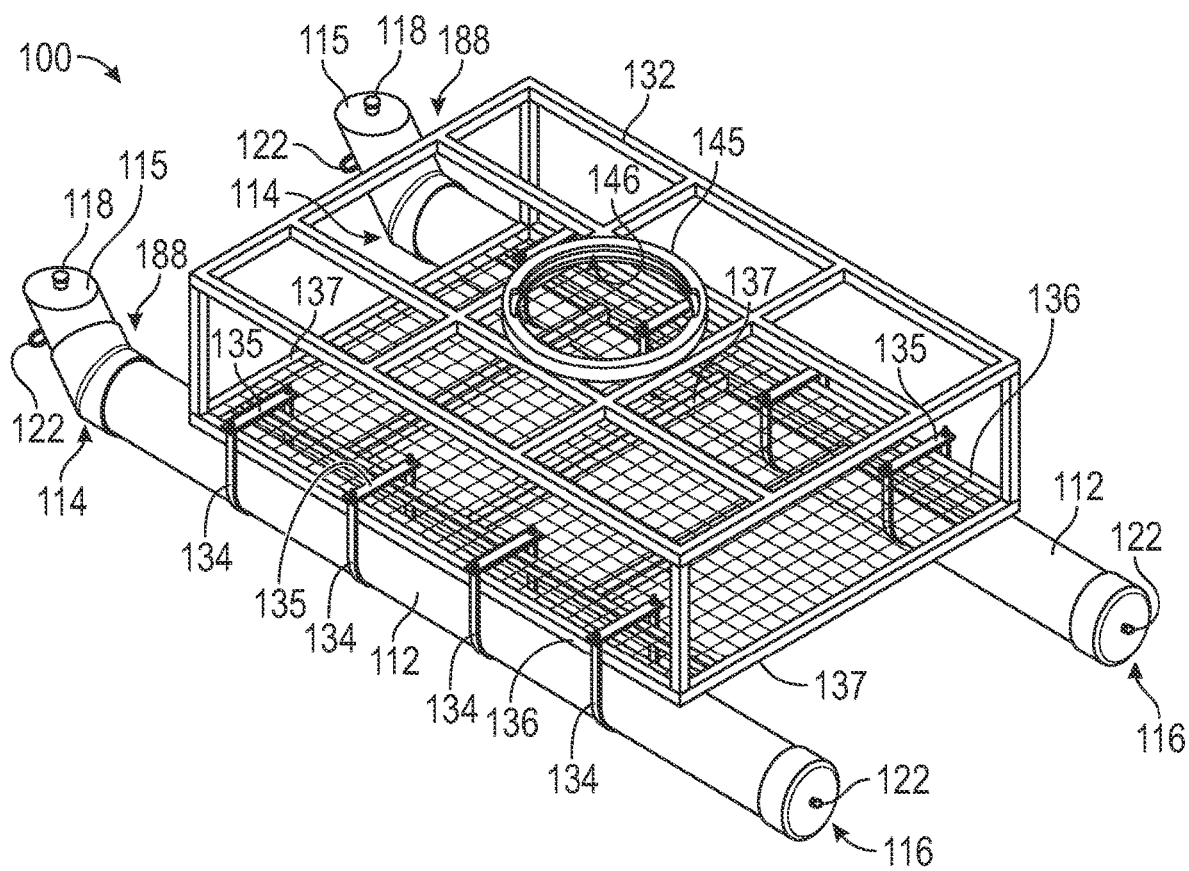
FIG. 9 is a top perspective view of an aquaculture apparatus in accordance with the present disclosure.
Figure 11:
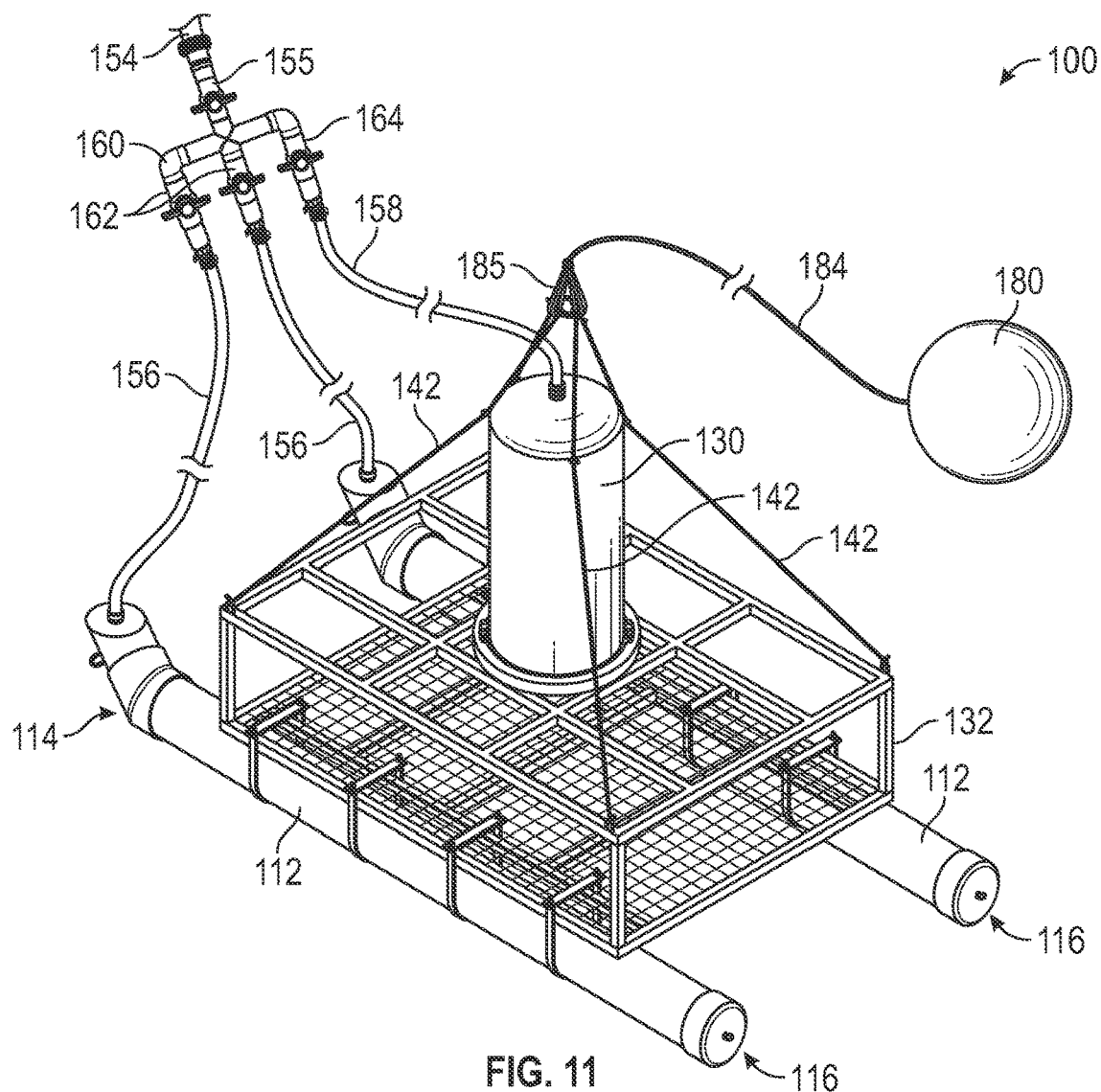
FIG. 11 is a top perspective view of an aquaculture apparatus in accordance with the present disclosure.
Figure 12:
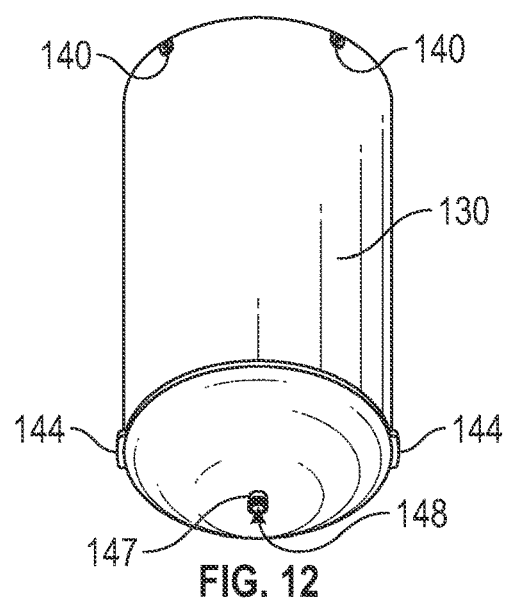
FIG. 12 is a bottom perspective view of a floatation control tank for use with an aquaculture apparatus in accordance with the present disclosure.
Figure 13:
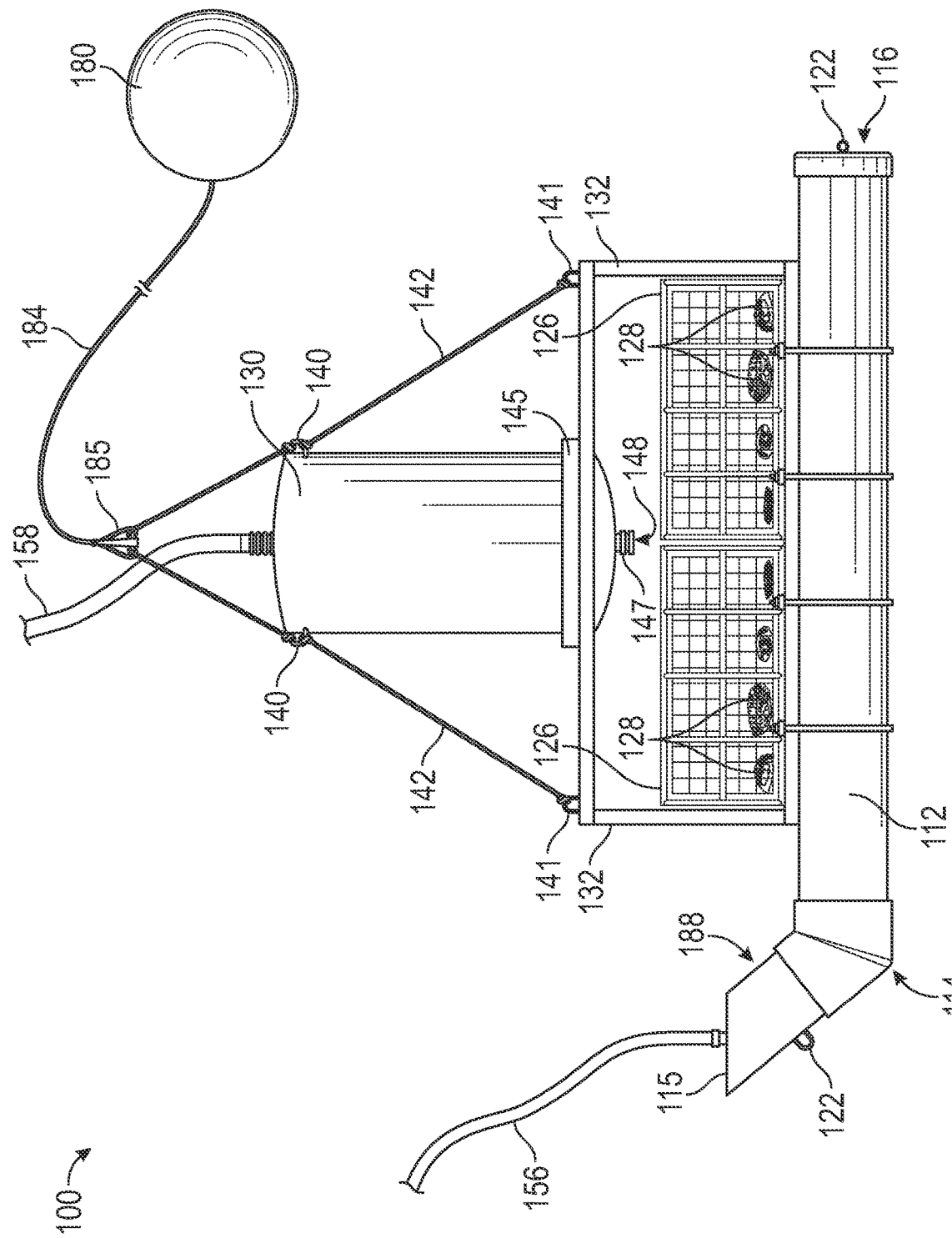
FIG. 13 is a side view of an aquaculture apparatus in accordance with the present disclosure.

FIGS. 9-19 illustrate another embodiment of an aquaculture apparatus 100 that may be utilized to control the depth of the apparatus 100 at any depth in the water 170 column, including a floating position, multiple suspended positions at different depths, and a completely submerged position in which the apparatus 100 is resting on the water bottom 174. The aquaculture apparatus 100 comprises a lift vessel 112, a container 126 for holding shellfish 128, a floatation control tank 130, and a compressed gas source 150 configured to independently supply gas to each of the lift vessel 112 and the floatation control tank 130. The apparatus 100 further comprises a frame structure 132 attached to the lift vessel 112. The frame structure 132 is designed to hold and secure shellfish 128 within the structure. FIG. 9 shows the apparatus 100 with the frame structure 132 attached to the lift vessel 112 and with the floatation control tank 130 and compressed gas source 150 both disconnected from the apparatus. In a preferred embodiment, the frame structure 132 comprises a plurality of rigid structural members 136, 137 designed so that shellfish containers 126 can be inserted within the frame structure 132 and removably secured to the frame structure 132, as best seen in FIG. 13. The shellfish containers 126 are preferably mesh or wire containers that may be flexible, whereas the rigid frame structure 132 is suitable for providing structural support for other components of the apparatus 100. Alternatively, the frame structure 132 may be designed with relatively small diameter openings so that the frame 132 itself be used to contain shellfish 128. As best seen in FIG. 9, the frame structure 132 may include a meshed flooring structure having small diameter openings for supporting the shellfish containers 126, which may be secured directly to the floor or other structural members using suitable types of fasteners.

Figure 10:
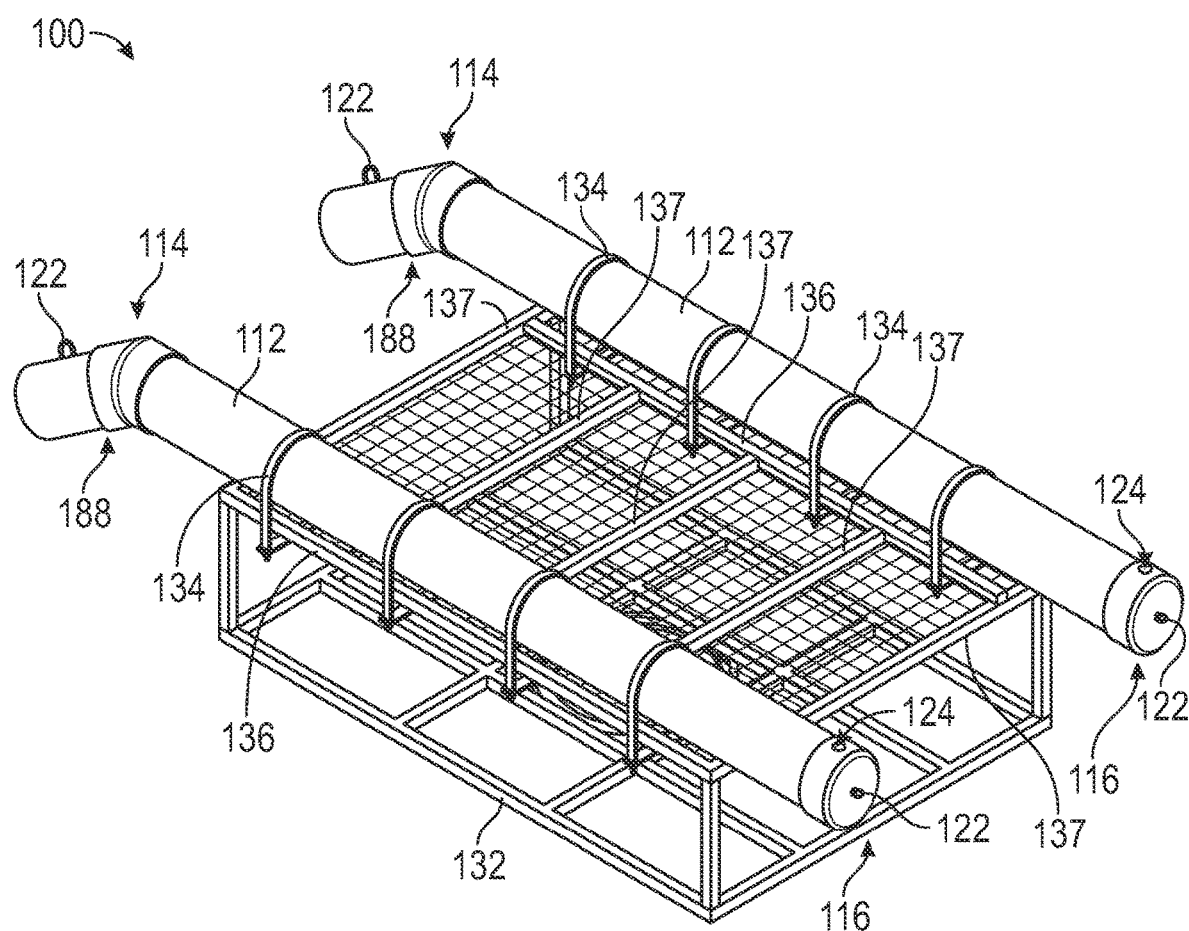
FIG. 10 is a bottom perspective view of an aquaculture apparatus in accordance with the present disclosure.

The lift vessel 112 has rigid walls and has an opening 124 on a bottom side of the lift vessel 112, which can be seen in FIG. 10, which shows the apparatus 100 in an inverted position to illustrate the bottom opening 124. The opening 124 allows water to enter the interior of the lift vessel 112 to displace air in the lift vessel 112 when moving the apparatus 100 from the floating position to a suspended position. The opening 124 also provides a passageway through which air may displace water in the lift vessel 112 by forcing the water out through the opening 124 when moving the apparatus 100 from a suspended position to the floating position.

In a preferred embodiment, as best seen in FIGS. 9-11, the apparatus 100 comprises a plurality of lift vessels 112 that are spaced apart from each other and that each have at least a section having an elongated tubular shape. In this embodiment, the apparatus 100 further comprises a plurality of lift vessel fluid supply lines 156 each connecting a respective one of the plurality of lift vessels 112 to the compressed gas source 150. Each lift vessel 112 has a first end 114 and a second end 116. As shown in FIG. 11, each lift vessel fluid supply line 156 is connected to a respective first end 114 of a lift vessel 112, and each lift vessel 112 has an opening 124 located on the bottom side of the lift vessel 112 and positioned at the second end 116 of the lift vessel 112, as shown in FIG. 10. Each opening 124 is positioned at a low point of the lift vessel 112 when the apparatus 100 is in an upright position. FIG. 11 illustrates the apparatus 100 with two lift vessels 112, though additional spaced lift vessels may be utilized to increase the capacity of the apparatus.

As best seen in FIG. 9, each of the lift vessels 112 may be fastened to the frame structure 132 with a plurality of U-bolts 134 sized to fit around each tubular lift vessel 112 having a circular cross-sectional shape. Each U-bolt 134 may be fastened to two opposing parallel longitudinal frame members 136 of the frame structure 132 using a fastening plate 135 and threaded fasteners. The opposing longitudinal frame members 136 are preferably positioned on opposing sides of each of the tubular lift vessels 112. In a preferred embodiment, as best seen in FIGS. 9 and 10, the frame structure 132 further comprises a plurality of cross support frame members 137 each connected to two longitudinal frame members 136 to provide structural support between the lift vessels 112 and support for the shellfish containers 126 contained within the frame structure 132.

In a preferred embodiment, as best seen in FIGS. 11 and 13, the first end 114 of each lift vessel 112 has an angled section 188 that is angled upwardly relative to the elongated tubular section. In this embodiment, each lift vessel fluid supply line 156 may be connected to an upwardly facing terminal end 115 of the first end 114 of each of the lift vessels 112. FIG. 9 shows the terminal ends 115 of each lift vessel 112 with a nozzle 118 for connecting the lift vessel fluid supply lines 156 to each of the lift vessels 112. The angled sections 188 of each lift vessel 112 may aid in breaking waves when towing the apparatus 100. The angled sections 188 may also provide a high point of each vessel 112 to which air may be supplied to more effectively displace water inside the vessels 112 with air by forcing the water out of the bottom openings 124, which are at a low point at an opposite end of each vessel 112. To facilitate towing of the apparatus 100, each lift vessel 112 may have a loop 122 installed at each end of the vessel 112 for securing a tow rope, chain, or similar type of tow line. Loops 122 at the first end 114 may be used for direct towing of the apparatus 100, and loops 122 at the second end 116 may be used to attach one apparatus 100 to another apparatus for towing multiple apparatuses at the same time.

The floatation control tank 130 has a rigid tank wall and is attached to the frame structure 132 in a generally centered position of the apparatus 100, as best seen in FIGS. 11 and 13. The floatation control tank 130 is disposed above both the shellfish containers 126 and the lift vessels 112 when the apparatus 100 is in an upright position for normal use, as best seen in FIG. 13. In a preferred embodiment, the floatation control tank 130 is a cylindrical tank, which preferably has rounded heads at a top end and at a bottom end. When attached to the frame structure 132, the tank 130 is preferably disposed in a generally vertical position such that the height of the tank 130 is greater than the width of the tank 130. The apparatus 100 is preferably designed so that the height of the tank 130 is approximately equal to the distance between two opposing lift vessels 112 attached to each other by the frame structure 132 to which the tank 130 is also attached, which may prevent inadvertent overturning of the apparatus 100 when floating or sinking the apparatus. In a preferred embodiment, the floatation control tank 130 is removably attached to a top side of the frame structure 132. To facilitate removable attachment of the floatation control tank 130 to the frame structure 132, the tank 130 may preferably have a pair of opposing tabs 144 extending outwardly from the exterior shell of the tank 130 near the bottom head of the tank 130, as best seen in FIG. 12. In this embodiment, as best seen in FIG. 9, the frame structure 132 may comprise a circular support structure 145 sized to receive the tank 130 within the structure 145. The circular support structure 145 has an internal groove 146 into which the tabs 144 may be placed to lock the tank 130 onto the frame structure 132. The circular support structure 145 may have two opposing slots positioned so that the two opposing tabs 144 may be placed downward into each respective one of the slots so that both tabs 144 enter the internal groove 146, and the tank 130 may then be rotated to slide the tabs 144 in the groove 146 away from the slots to securely attach the tank 130 to the circular support structure 145.

In a preferred embodiment, to further secure the floatation control tank 130 to the frame structure 132 and support the tank 130 in a generally vertical position, a plurality of tensioned wires 142 may be utilized to further attach the tank 130 to the frame structure 132 at a plurality of attachment points, which are preferably located at four corners of the frame structure 132, as best seen in FIGS. 11 and 13. The tank 130 may have a plurality of eyelets 140 located near the top head of the tank 130, and the frame structure 132 may also have a plurality of eyelets 141 positioned at the attachment points. Each wire 142 may be connected to a tank eyelet 140 at one end of the wire and to a frame structure eyelet 141 at a second end of the wire to provide tensioned support for the tank 130.

As best seen in FIG. 12, the floatation control tank 130 has an opening 148 located on a bottom side of the tank 130. The tank 130 preferably has only a single opening 148 positioned at the center of the rounded bottom head of the tank 130 so that the opening 148 is positioned at a low point of the tank 130. The tank 130 may have a nozzle 147 at the bottom, and the opening 148 may be defined by an aperture at a lower end of the nozzle 147. Like openings 124 on the bottoms of the lift vessels 112, opening 148 is preferably an aperture that remains open at all times. The opening 148 allows water to move into the tank 130 through the opening 148 when the water is displacing air in the tank 130. The opening 148 also allows water to move out of the tank 130 through the opening 148 when air is being used to displace water in the tank 130. A tank fluid supply line 158 connects the tank 130 to the compressed gas source 150. As best seen in FIGS. 11 and 13, the tank fluid supply line 158 is preferably connected to a top side of the tank 130, preferably at a centered position of the top head.

Figure 16:
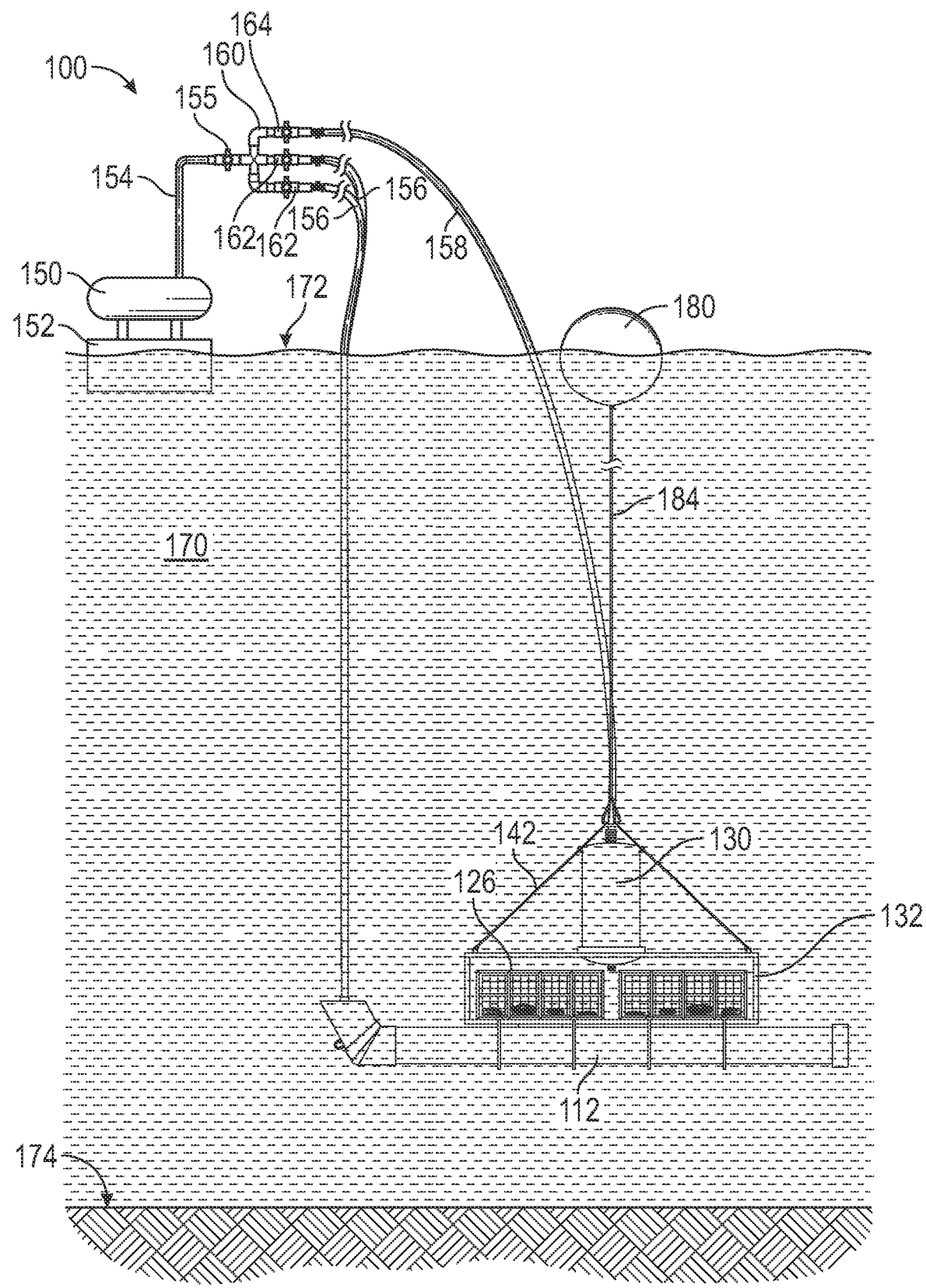
FIG. 16 is a side view of an aquaculture apparatus in a second suspended position while in use in a body of water in accordance with the present disclosure.
Figure 17:
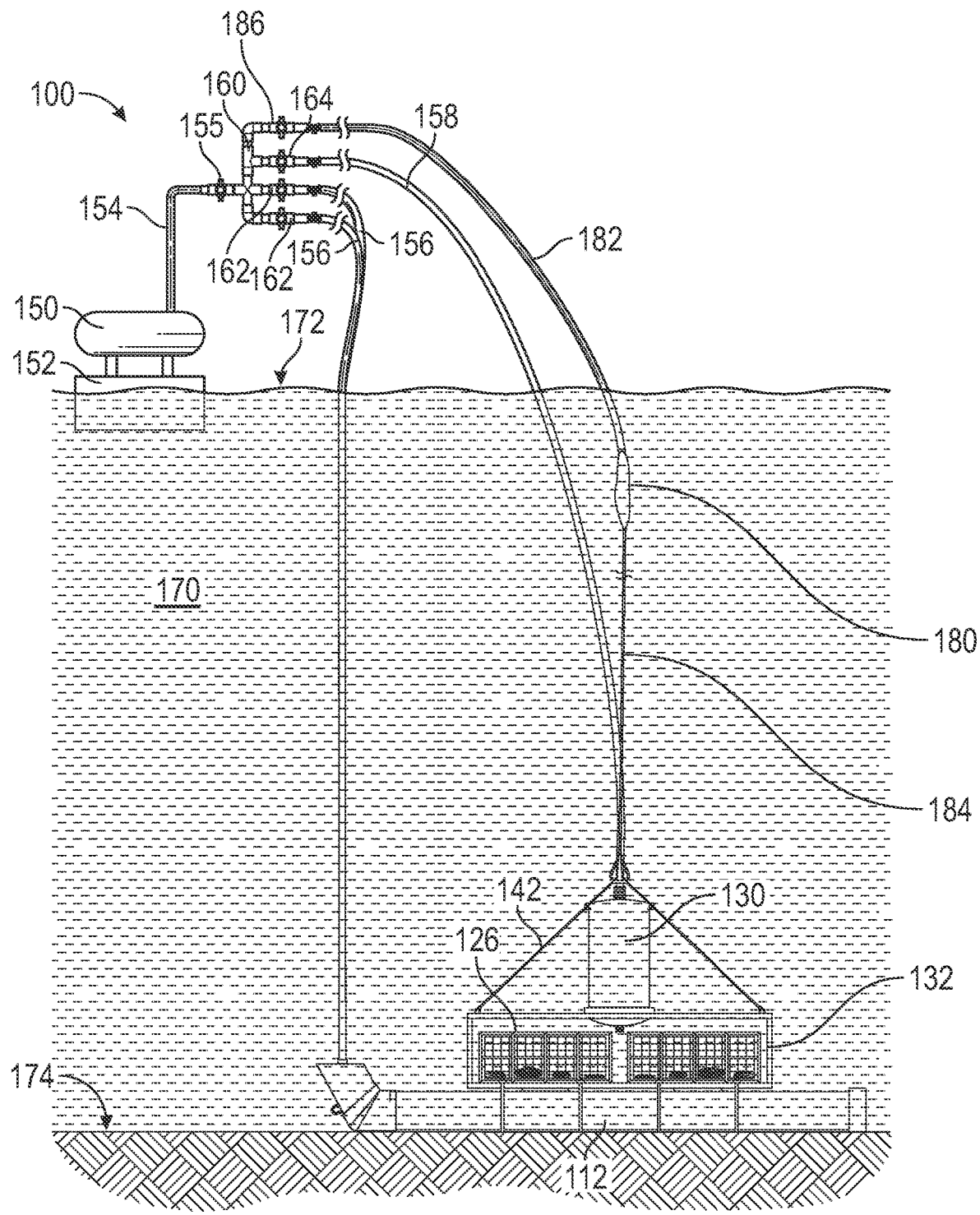
FIG. 17 is a side view of an aquaculture apparatus in a submerged position while in use in a body of water in accordance with the present disclosure.

The apparatus 100 further comprises a suspension buoy 180 that is tethered to the apparatus 100 by a tether line 184. As shown in FIG. 16, the suspension buoy 180 allows the apparatus 100 to be suspended at a depth in the water column defined by the length of the tether line 184. Thus, the suspension depth may be adjusted by adjusting the length of the tether 184. In a preferred embodiment, the tether line 184 is a generally flexible line that is attached to a top end of the tank 130. In a preferred embodiment, the tether 184 may be connected to a harness 185 that is connected to each of the eyelets 140 on the tank 130 to provide balanced support when suspending the apparatus 100 from the suspension buoy 180. In an optional embodiment, the harness 185 may be connected to eyelets 141. In one embodiment, the suspension buoy 180 is constructed of foam, plastic, or other suitable floatation material and is not inflatable. In an alternative embodiment, as shown in FIG. 17, the suspension buoy 180 may be inflatable. In this embodiment, the apparatus 100 further comprises a suspension buoy fluid supply line 182 connecting the suspension buoy 180 to the compressed gas source 150. To suspend the apparatus 100 with the suspension buoy 180 floating on the water surface 172, gas may be supplied through the suspension buoy fluid supply line 182 to inflate the suspension buoy 180. FIG. 17 shows the suspension buoy 180 in a deflated state, which optionally allows the apparatus 100 to sink all the way to the water bottom 174 and rest on the bottom 174.

Figure 15:
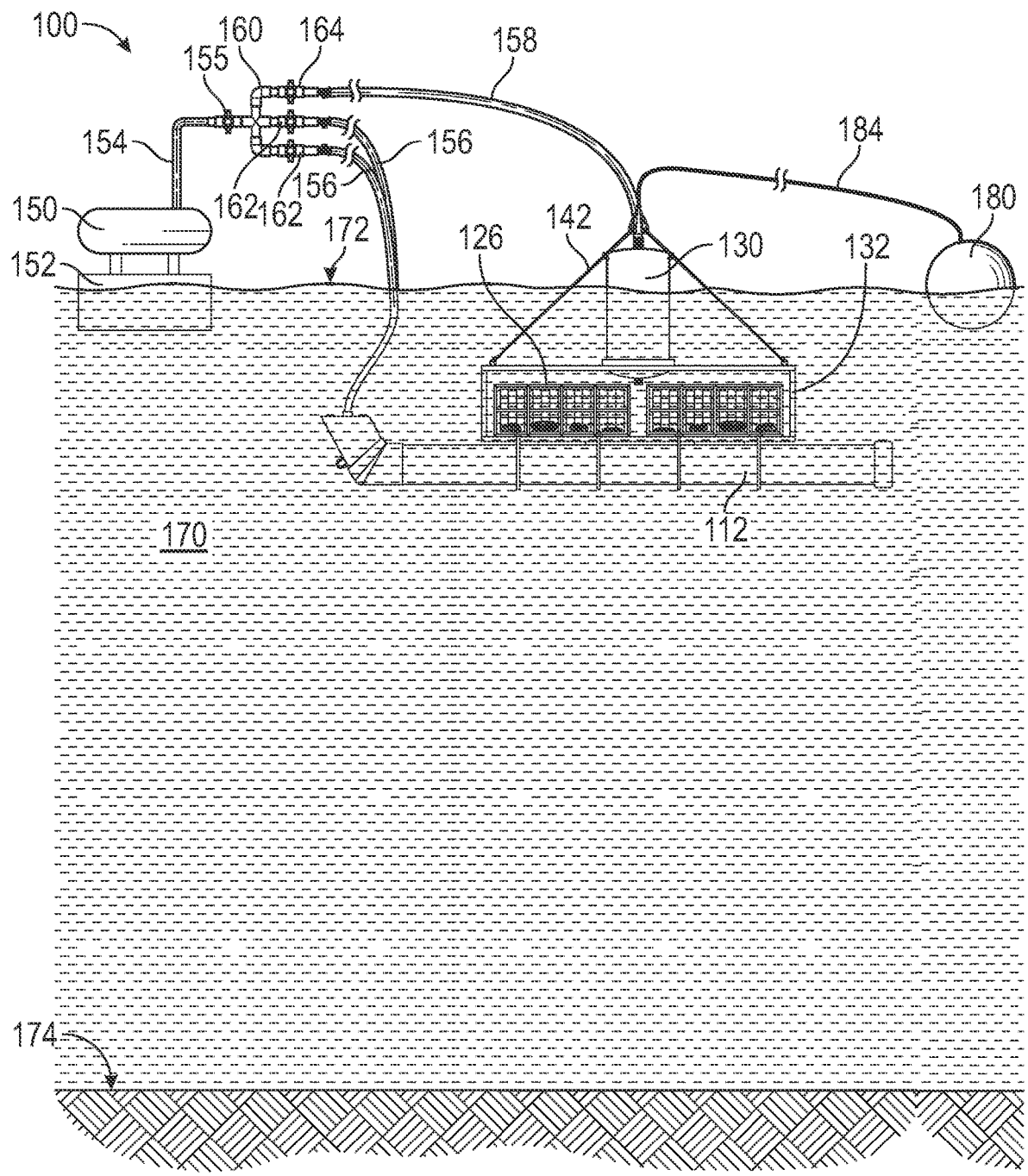
FIG. 15 is a side view of an aquaculture apparatus in a first suspended position while in use in a body of water in accordance with the present disclosure.

In a preferred embodiment, the apparatus 100 further comprises a manifold 160 configured to independently supply gas from the compressed gas source 150 to each of the lift vessels 112 and to the floatation control tank 130, and optionally to the suspension buoy 180. As best seen in FIG. 11, the manifold 160 comprises a plurality of valves for controlling the gas flow. The manifold 160 is fluidly connected to the compressed gas source 150 through a primary fluid supply line 154 and has a primary gas supply valve 155 for controlling the flow of gas from the compressed gas source 150 into the manifold 160. The manifold 160 is fluidly connected to the floatation control tank 130 through a tank fluid supply line 158. The manifold has a floatation control valve 164 for supplying gas to the floatation control tank 130 in order to control the apparatus 100 in a suspended position in which the floatation control tank 130 is floating at the water surface 172, as shown in FIG. 15. The manifold 160 further comprises at least one lift valve 162 for supplying gas to one or more lift vessels 112 through at least one lift vessel fluid supply line 156.

Figure 14:
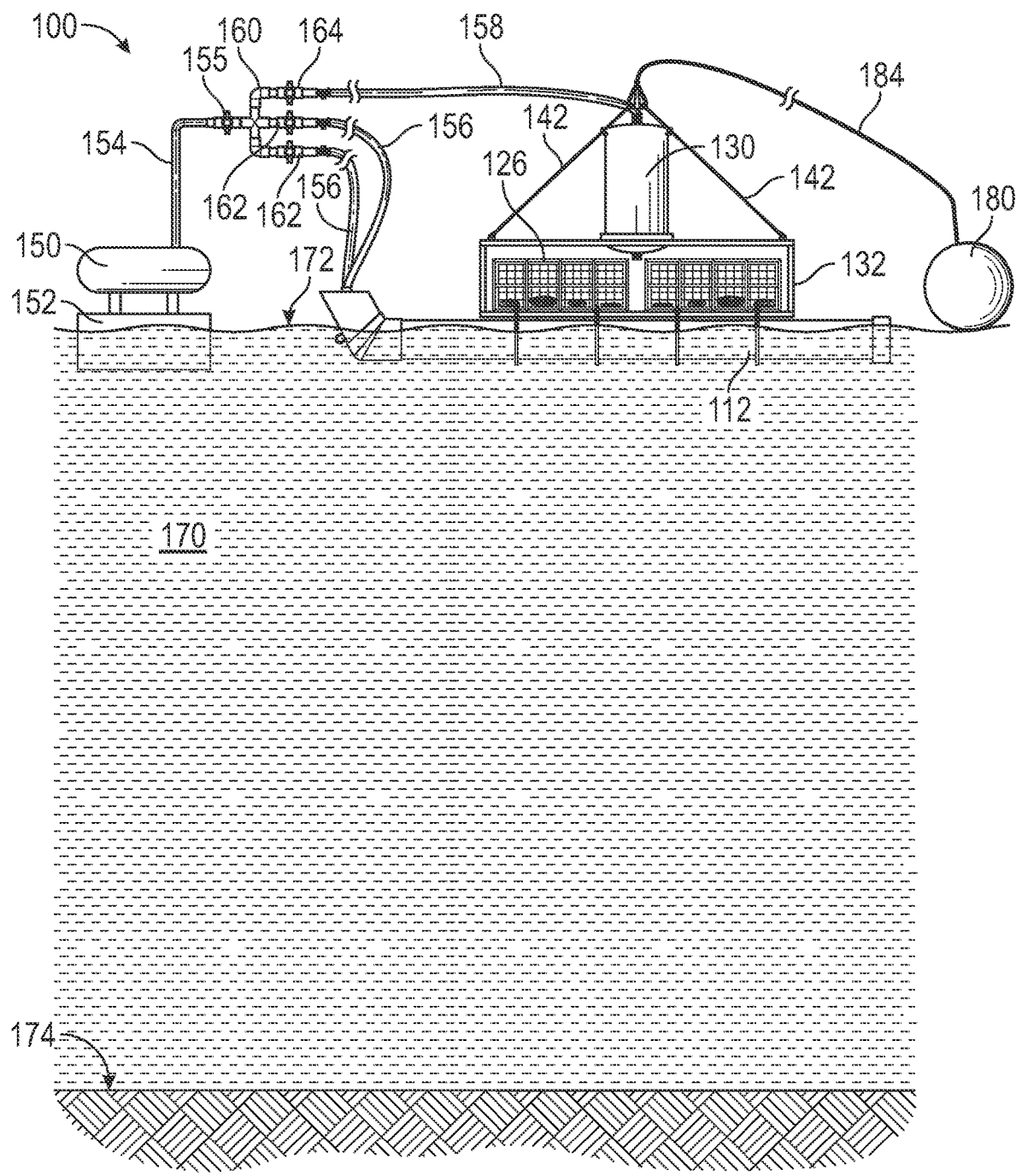
FIG. 14 is a side view of an aquaculture apparatus in a floating position while in use in a body of water in accordance with the present disclosure.

As shown in FIGS. 14-17, the compressed gas source 150 is preferably secured to a floating barge 152 or similar floating structure floating on the water surface 172. The apparatus 100 may be deployed in at least three different positions, and optionally in four positions. FIG. 14 shows the apparatus 100 deployed in a floating position with the lift vessel 112 floating on the water surface 172. In the floating position, the lift vessel 112 is filled with gas and is designed to lift the frame structure 132 to a position in which the frame structure 132 is positioned above the surface 172 of the water 170. FIG. 15 shows the apparatus 100 deployed in a first suspended position with the floatation control tank 130 floating on the water surface 172. In the first suspended position, the floatation control tank 130 is designed to suspend the frame structure 132 below the water surface 172. In the first suspended position, the tank 130 is filled with gas, and gas is evacuated from the lift vessel 112. When gas is evacuated from the lift vessel 112, water from the body of water 170 displaces the gas in the lift vessel 112 and fills the lift vessel 112 with water. FIG. 16 shows the apparatus 100 deployed in a second suspended position with the suspension buoy 180 floating on the water surface 172 and the apparatus 100 suspended in the water column at a depth defined by the length of the tether line 184. In the second suspended position, the suspension buoy 180 is designed to suspend the frame structure 132 in a second position below the water surface 172. In the second suspended position, the suspension buoy 180 is floating on the water surface 172, and gas is evacuated from both the tank 130 and the lift vessel 112 so that both the tank 130 and lift vessel 112 fill with water. FIG. 17 shows an optional embodiment in which suspension buoy 180 is inflatable, which allows the apparatus 100 to be deployed in a completely submerged position with the lift vessel 112 resting on the water bottom 174. In the submerged position, the suspension buoy 180 is deflated, and gas has been displaced by water in both the tank 130 and the lift vessel 112.

A method of controlling floatation of the apparatus 100 is also provided. First, the apparatus 100 may be deployed in the floating position by substantially filling the lift vessels 112 with gas so that the lift vessels 112 are floating on the water surface 172 and supporting the frame structure 132 and any shellfish 128 contained therein above the water surface 172. The apparatus 100 may then be submerged in the body of water 170 by evacuating gas from the lift vessels 112 and from the floatation control tank 130, thereby allowing both the lift vessels 112 and the tank 130 to substantially fill with water so that the lift vessels 112 and tank 130 sink below the water surface 172. This action will deploy the apparatus 100 in the second suspended position, as shown in FIG. 16, with the suspension buoy 180 floating on the surface 172 and both the lift vessels 112 and tank 130 suspended in the water 170 at a depth below the suspension buoy 180, or optionally in the completely submerged position, as shown in FIG. 17. To move the apparatus 100 to the first suspended position, as shown in FIG. 15, gas may be supplied from the compressed gas source 150 to the tank 130 to substantially fill the tank 130 with gas, thereby causing the tank 130 to rise to the surface 172 with the lift vessels 112 and the frame structure 132 suspended below the tank 130. When gas is supplied to the tank 130, the gas displaces water in the tank 130 by forcing the water out of the opening 148 located on the bottom of the tank 130. To then move the apparatus 100 into the floating position, as shown in FIG. 14, gas may be supplied from the compressed gas source 150 to the lift vessels 112, thereby causing the apparatus 100 to float with the frame structure 132 being held above the surface 172. When gas is supplied to the lift vessels 112, the gas displaces water in the lift vessels 112 by forcing the water out of the openings 124 located on the bottom sides of the lift vessels 112.

To submerge the apparatus 100, pressure may be relieved from the lift vessels 112 and the tank 130. First, pressure may be relieved from the lift vessels 112 to the atmosphere via the lift vessel fluid supply lines 156 to evacuate gas from the lift vessels 112 so that water displaces the gas in the lift vessels 112 via water entering each of the lift vessels 112 through the opening 124 located on the bottom side of each lift vessel 112, thereby causing each lift vessel 112 to sink below the surface 172. Next, pressure may be relieved from the tank 130 to the atmosphere via the tank fluid supply line 158 to evacuate gas from the tank 130 so that water displaces the gas in the tank 130 via water entering the tank 130 through the opening 148 located on the bottom side of the tank 130, thereby causing the tank 130 to sink below the surface 172.

In a preferred embodiment, the manifold 160 may be utilized for supplying gas and for relieving pressure. Gas may be supplied to the tank 130 from the compressed gas source 150 by opening the floatation control valve 164, and gas may be supplied from the compressed gas source 150 to each lift vessel 112 by opening each of the lift valves 162 on the manifold 160. Pressure may also be relieved from both the lift vessels 112 and the tank 130 to the atmosphere through the manifold 160 to allow water to displace gas in the lift vessels 112 and tank 130. To submerge the apparatus 100, pressure on the lift vessels 112 may first be relieved via the lift vessel fluid supply lines 156 by disconnecting the primary fluid supply line 154 from the primary gas supply valve 155 and opening the lift valves 162 and the primary gas supply valve 155. As the pressure is relieved, gas will flow to the atmosphere through the manifold 160 and water will displace substantially all of the gas in the lift vessels 112. At this point, the floatation control valve 164 should remain closed to maintain gas pressure inside the tank 130. Pressure may then be relieved from the tank 130 via the tank fluid supply line 158 by opening valve 164 to allow water to displace gas in the tank 130. In an alternative embodiment, the manifold 160 may have one or more separate designated pressure relief valves that may be opened individually for the purposes of relieving pressure on one or more lift vessels 112, as well as the tank 130, to the atmosphere without the need to disconnect the primary fluid supply line 154 from the manifold 160.

In one embodiment, the suspension buoy 180 is inflatable. In this embodiment, as shown in FIG. 17, the manifold 160 may comprise an additional valve 186 for supply gas to the suspension buoy 180 and for relieving pressure from the buoy 180, and the buoy 180 may be connected to the manifold 160 via a fluid supply line 182. In this embodiment, pressure may be relieved from the suspension buoy 180 through the suspension buoy fluid supply line 182 by opening valve 186 to allow gas in the buoy 180 to flow to the atmosphere, thereby causing the buoy 180 to deflate, as shown in FIG. 17. With the suspension buoy 180 deflated, the apparatus 100 may be deployed in the completely submerged position with the apparatus 100 resting on the water bottom 174. In this embodiment, to deploy the apparatus 100 in the second suspended position with the suspension buoy 180 floating on the water surface 172, valve 186 may be opened with the manifold 160 connected to the compressed gas source 150 to supply gas to the suspension buoy 180 to inflate the buoy 180, thereby causing the suspension buoy 180 to float on the surface 172.

Figure 18:
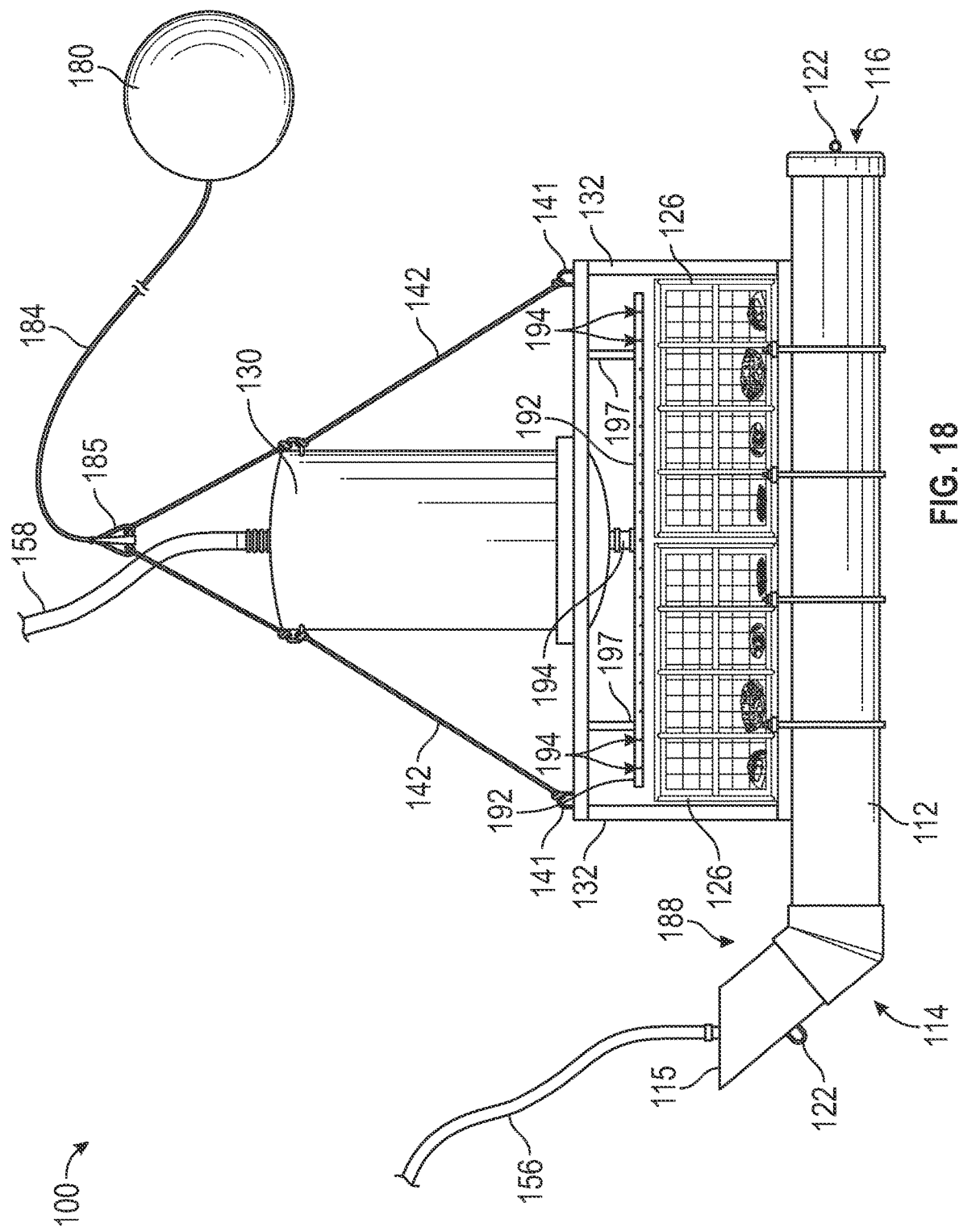
FIG. 18 is a side view of an alternative embodiment of an aquaculture apparatus in accordance with the present disclosure.
Figure 19:
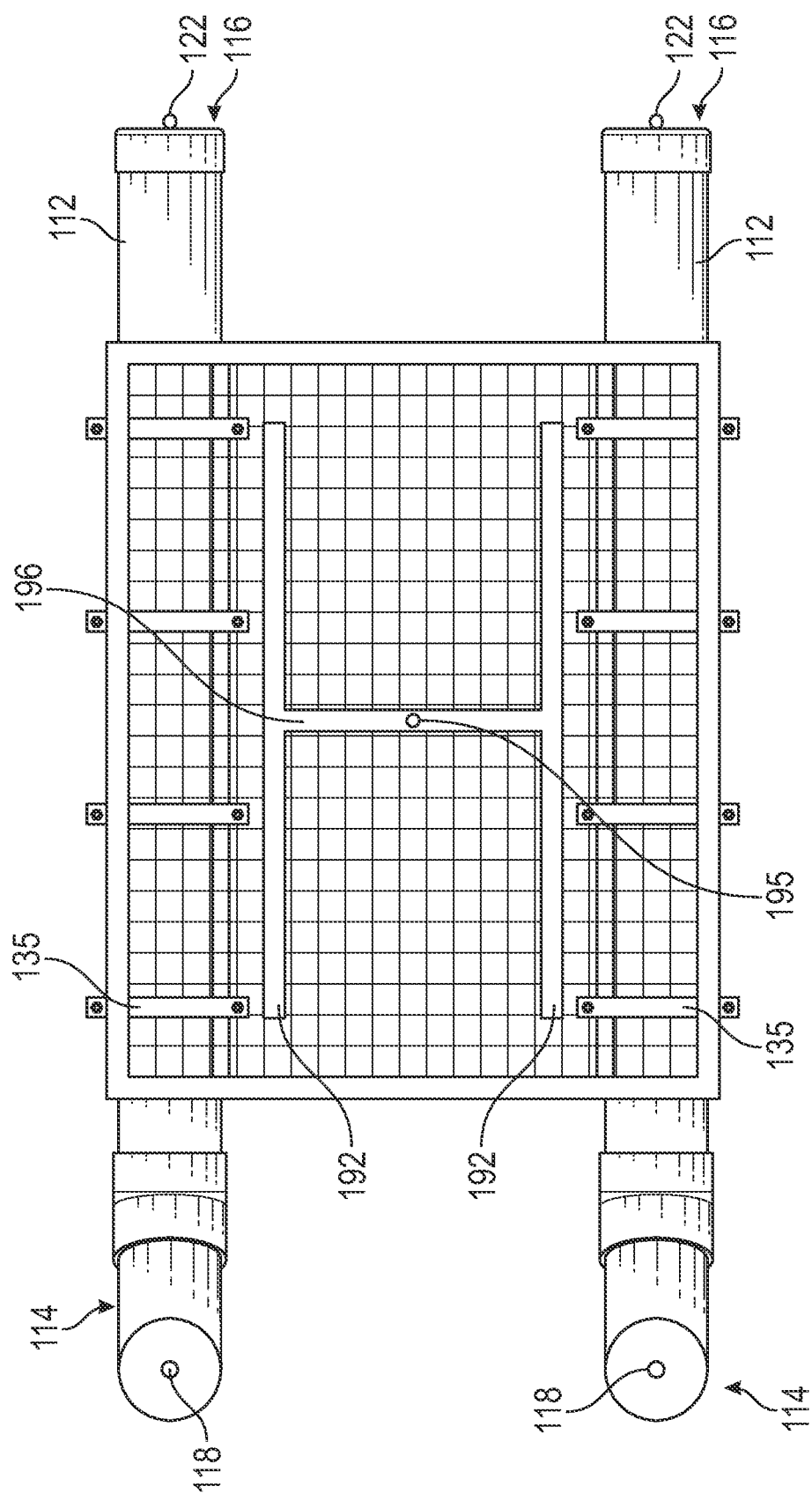
FIG. 19 is a schematic view of water distribution piping of an alternative embodiment of an aquaculture apparatus in accordance with the present disclosure.

In a preferred embodiment, as shown in FIGS. 18 and 19, the apparatus 100 further comprises a plurality of water distribution pipes 192 connected to a bottom of the tank 130. Each of the water distribution pipes 192 extends into an interior of the frame structure 132, and each of the pipes 192 has a plurality of openings 194 in a wall of the pipe 192. The openings 194 extend along a length of each pipe 192. The water distribution pipes 192 are fluidly connected to the floatation control tank 130. The pipes 192 may be connected to the tank 130 by a short length of pipe 190 or hose connected to the nozzle 147 located at the bottom of the tank 130, preferably in a centered position on the bottom head of the tank 130. Support members 197 are preferably utilized to attach the pipes 192 to structural members 136 or 137 to provide structural support to the pipes 192. In a preferred embodiment, the support members 197 are vertically positioned and attach the pipes 192 to members of the frame structure 132 positioned above the pipes 192. In this embodiment, when air is supplied to the tank 130 to displace water from the tank 130 in order to cause the floatation control tank 130 to rise in the water column, the water contained inside the tank 130 is pushed out of the plurality of openings 194 in the water distribution pipes 192. The openings 194 are positioned on a bottom side of each of the pipes 192 so that water from the tank 130 is flushed in a downward direction from the openings 194 in the pipes 192, which flushes water downward into the shellfish containers 126. This flushing action utilizes the force of water being displaced from the tank 130 to help wash away dirt and debris from the shellfish 128 to produce a cleaner product. When using water to displace air from the tank 130 to submerge the apparatus 100, the water may enter the tank 130 through the plurality of openings 194 in the pipes 192. Thus, in this embodiment, the openings 194 in the pipes 192 may collectively function in the same manner as the opening 148 in the bottom of the tank 130.

FIG. 19 shows a schematic view of a preferred embodiment of the water distribution piping 192, which is generally disposed within the interior of frame structure 132 in a position below tank 130 and above the shellfish 128 contained within containers 126. In a preferred embodiment, the apparatus 100 comprises two parallel water distribution pipes 192 that are disposed in a generally horizontal position above two rows of shellfish containers 126. Additional pipes 192 in other configurations may be utilized depending on the size of the apparatus 100 and the number and configuration of shellfish containers 126. The two parallel water distribution pipes 192 may be fluidly connected to each other by a connecting pipe 196 extending between the parallel pipes. Hose or pipe 190 may be connected to a nozzle 195 on the connecting pipe 196 to supply water from the tank 130 into both of the parallel water distribution pipes 192.

It is understood that versions of the invention may come in different forms and embodiments. Additionally, it is understood that one of skill in the art would appreciate these various forms and embodiments as falling within the scope of the invention as disclosed herein.

What is claimed is:

1. An aquaculture apparatus, comprising:
   a lift vessel;
   a frame structure for holding shellfish therein, wherein the frame structure is attached to the lift vessel;
   a floatation control tank having a rigid tank wall, wherein the tank is attached to the frame structure in a generally centered position of the apparatus, wherein the tank is disposed above the lift vessel when the apparatus is in an upright position;
   a suspension buoy tethered to the apparatus;
   a compressed gas source configured to independently supply gas to each of the lift vessel and the tank, respectively;

a lift vessel fluid supply line connecting the lift vessel to the compressed gas source; and a tank fluid supply line connecting the tank to the compressed gas source, wherein the lift vessel is configured to lift the frame structure to a position in which the frame structure is positioned entirely above a water surface when the apparatus is in a floating position on the water surface in which the lift vessel is filled with gas, wherein the tank is configured to suspend the frame structure in a first position below the water surface when the apparatus is in a first suspended position in which the tank is filled with gas and in which gas is evacuated from the lift vessel, and wherein the suspension buoy is configured to suspend the frame structure in a second position below the water surface when the apparatus is in a second suspended position in which the suspension buoy is floating on the water surface and gas is evacuated from both the tank and the lift vessel.

2. The apparatus of claim 1, wherein the tank has an opening located on a bottom side of the tank.

3. The apparatus of claim 1, wherein the tank is disposed in a generally vertical position such that a height of the tank is greater than a width of the tank.

4. The apparatus of claim 1, wherein the tank is removably attached to the frame structure.

5. The apparatus of claim 1, wherein the suspension buoy is tethered to the apparatus by a generally flexible line, wherein the line is attached to a top end of the tank.

6. The apparatus of claim 1, wherein the suspension buoy is inflatable, wherein the apparatus further comprises a suspension buoy fluid supply line connecting the suspension buoy to the compressed gas source.

7. The apparatus of claim 1, wherein the lift vessel has a rigid vessel wall, wherein the lift vessel has an opening located on a bottom side of the lift vessel.

8. The apparatus of claim 1, wherein the apparatus comprises a plurality of lift vessels that are spaced apart from each other, wherein each of the plurality of lift vessels comprises an elongated tubular section, wherein the apparatus comprises a plurality of lift vessel fluid supply lines each connecting a respective one of the plurality of lift vessels to the compressed gas source, wherein each lift vessel has a first end and a second end, wherein each lift vessel fluid supply line is connected to a respective first end of a lift vessel, and wherein each lift vessel has an opening located on a bottom side of the lift vessel and positioned at the second end of the lift vessel.

9. The apparatus of claim 8, wherein the first end of each of the plurality of lift vessels has an angled section that is angled upwardly relative to the elongated tubular section, wherein each lift vessel fluid supply line is connected to an upwardly facing terminal end of the first end of each respective one of the plurality of lift vessels.

10. The apparatus of claim 1, further comprising a manifold fluidly connected to the compressed gas source through a primary fluid supply line, to the lift vessel through the lift vessel fluid supply line, and to the tank through the tank fluid supply line, wherein the compressed gas source is configured to independently supply gas to each of the lift vessel and the tank, respectively, through the manifold.

11. The apparatus of claim 1, further comprising a plurality of water distribution pipes connected to a bottom of the tank, wherein each of the water distribution pipes extends into an interior of the frame structure, wherein each pipe of the plurality of water distribution pipes has a plurality of openings in a wall of the pipe.

12. A method of controlling floatation of an aquaculture apparatus, said method comprising the steps of:

providing an aquaculture apparatus comprising:
a lift vessel,
a frame structure for holding shellfish therein, wherein the frame structure is attached to the lift vessel,
a floatation control tank having a rigid tank wall, wherein the tank is attached to the frame structure in a generally centered position of the apparatus, wherein the tank is disposed above the lift vessel when the apparatus is in an upright position,
a suspension buoy tethered to the apparatus,
a compressed gas source configured to independently supply gas to each of the lift vessel and the tank, respectively,
a lift vessel fluid supply line connecting the lift vessel to the compressed gas source, and
a tank fluid supply line connecting the tank to the compressed gas source,
wherein the lift vessel is configured to lift the frame structure to a position in which the frame structure is positioned entirely above a water surface when the apparatus is in a floating position on the water surface in which the lift vessel is filled with gas, wherein the tank is configured to suspend the frame structure in a first position below the water surface when the apparatus is in a first suspended position in which the tank is filled with gas and in which gas is evacuated from the lift vessel, and wherein the suspension buoy is configured to suspend the frame structure in a second position below the water surface when the apparatus is in a second suspended position in which the suspension buoy is floating on the water surface and gas is evacuated from both the tank and the lift vessel;

submerging the apparatus in a body of water by evacuating gas from the lift vessel and from the tank, thereby allowing both the lift vessel and the tank to substantially fill with water;

then supplying gas from the compressed gas source to the tank to substantially fill the tank with gas, thereby causing the tank to rise to the surface of the body of water with the lift vessel and the frame structure suspended in the body of water below the tank; and then floating the apparatus by supplying gas from the compressed gas source to the lift vessel, thereby causing the apparatus to float with the frame structure being held entirely above the surface of the water.

13. The method of claim 12, further comprising the step of suspending the apparatus in the body of water by floating the suspension buoy on the surface of the water and evacuating gas from both the lift vessel and from the tank, thereby causing both the lift vessel and the tank to sink below the surface of the water and to be suspended in the body of water at a depth below the suspension buoy.

14. The method of claim 13, wherein the suspension buoy is inflatable, wherein the apparatus further comprises a suspension buoy fluid supply line connecting the suspension buoy to the compressed gas source, wherein the step of suspending the apparatus in the body of water comprises supplying gas from the compressed gas source to the suspension buoy to inflate the suspension buoy, thereby causing the suspension buoy to float on the surface of the water.

15. The method of claim 12, wherein the lift vessel has a rigid vessel wall, wherein the lift vessel has an opening located on a bottom side of the lift vessel, and wherein the tank has an opening located on a bottom side of the tank.

16. The method of claim 15, wherein the step of submerging the apparatus comprises the steps of:
- first relieving pressure from the lift vessel to the atmosphere via the lift vessel fluid supply line to evacuate gas from the lift vessel so that water displaces the gas in the lift vessel via water entering the lift vessel through the opening located on the bottom side of the lift vessel, thereby causing the lift vessel to sink below the surface of the water; and then
- relieving pressure from the tank to the atmosphere via the tank fluid supply line to evacuate gas from the tank so that water displaces the gas in the tank via water entering the tank through the opening located on the bottom side of the tank, thereby causing the tank to sink below the surface of the water.

17. The method of claim 15, wherein the step of supplying gas from the compressed gas source to the tank comprises supplying gas from the compressed gas source to the tank so that the gas displaces water in the tank by forcing the water out of the opening located on the bottom side of the tank.

18. The method of claim 15, wherein the step of floating the apparatus comprises supplying gas from the compressed gas source to the lift vessel so that the gas displaces water in the lift vessel by forcing the water out of the opening located on the bottom side of the lift vessel.

19. The method of claim 12, wherein the apparatus further comprises a manifold fluidly connected to the compressed gas source through a primary fluid supply line, to the lift vessel through the lift vessel fluid supply line, and to the tank through the tank fluid supply line, wherein the manifold is configured to independently supply gas to each of the lift vessel and the tank, respectively,
- wherein the step of supplying gas to the tank comprises opening a float valve on the manifold, and
- wherein the step of supplying gas to the lift vessel comprises opening a lift valve on the manifold.

20. The method of claim 16, wherein the apparatus further comprises a manifold fluidly connected to the compressed gas source through a primary fluid supply line, to the lift vessel through the lift vessel fluid supply line, and to the tank through the tank fluid supply line, wherein the manifold is configured to independently supply gas to each of the lift vessel and the tank, respectively,
- wherein the step of relieving pressure from the lift vessel to the atmosphere comprises relieving pressure through the manifold, and
- wherein the step of relieving pressure from the tank to the atmosphere comprises relieving pressure through the manifold.

* * * * *